United States Patent [19]
Yianilos

[11] Patent Number: 5,978,797
[45] Date of Patent: Nov. 2, 1999

[54] MULTISTAGE INTELLIGENT STRING COMPARISON METHOD

[75] Inventor: Peter N. Yianilos, Princeton, N.J.

[73] Assignee: NEC Research Institute, Inc., Princeton, N.J.

[21] Appl. No.: 08/890,659

[22] Filed: Jul. 9, 1997

[51] Int. Cl.$^6$ ......................................... G06F 17/30
[52] U.S. Cl. ................................. 707/3; 707/4
[58] Field of Search ................................. 707/3, 4

[56] References Cited

U.S. PATENT DOCUMENTS

| | | | |
|---|---|---|---|
| 4,490,811 | 12/1984 | Yianilos et al. | 364/900 |
| 4,845,610 | 7/1989 | Parvin | 364/200 |
| 5,060,143 | 10/1991 | Lee | 364/200 |
| 5,113,340 | 5/1992 | McWherter | 364/419 |
| 5,418,951 | 5/1995 | Damashek | 707/102 |
| 5,706,365 | 1/1998 | Rangarajan et al. | 707/5 |
| 5,802,515 | 9/1998 | Adar et al. | 707/5 |

OTHER PUBLICATIONS

Master Thesis by Yianilos, "The Definition, Computation and Application of Symbol String Similarity Functions", Emory University, Department of Mathematics, 1978.

Yianilos, "A Dedicated Comparator Matches Symbol Strings Fast and Intelligently", Electronics Magazine, McGraw–Hill, Dec. 1983.

Rosenthal, "The PF474, A Coprocessor for String Comparison", Byte Magazine, 1984.

Buss et al, "Linear and O(n log n) Time Minimum–Cost Matching Algorithms for Quasi–Convex Tours", in the Proceedings of the 5$^{th}$ Annual ACM SIAM Symposium on Discrete Algorithms, 1994, pp. 65–76.

Buss et al, "A Bipartite Matching Approach to Approximate String Comparison and Search", technical report No. 95–193, from NEC Research Institute, Inc., Princeton, NJ.

Karp et al, "Two Special Cases of the Assignment Problem", in Discrete Mathematics, 13 (1975), pp. 129–142.

Hall et al, "Approximate String Matching", in Computer Surveys, vol. 12, No. 4, Dec. 1980, pp. 381–402.

Damashek, "Gauging Similarity With n–Grams: Language–Independent Categorization of Text", in Science, 267, 1995, pp. 843–848.

Huffman et al, "Aquaintance: A Novel Vector–Space N–Gram Technique for Document Categorization", in Proc. Test Retrieval Conference (TREC–3), Washington, DC 1995, NIST, pp. 305–310.

Knuth et al, "Fast Pattern Matching in Strings", SIAM Journal on Computing, vol. 6, No. 2, Jun. 1977, pp. 323–350.

Wu et al, "Fast Text Searching Allowing Errors", Communications of the ACM, Oct. 1992, vol. 35 No. 10, pp. 83–91.

Manber et al, "Glimpse: A Tool to Search Through Entire File Systems", in Proceedings of the Winter 1994 USENIX Conference, 1994, pp. 23–32.

*Primary Examiner*—Paul R. Lintz
*Assistant Examiner*—Jean Bolte Fleurantin
*Attorney, Agent, or Firm*—Philip J. Feig

[57] ABSTRACT

A multistage database search method includes a first stage that only considers textual polygraphic frequencies and a second stage that considers the location of the polygraphs and coarsely approximates the proper alignment between the query and the database strings and a third stage that provides a better approximation of the alignment. The final output is a listing of suggested database records ranked by their similarity to the query.

15 Claims, 1 Drawing Sheet

MULTISTAGE INTELLIGENT STRING COMPARISON METHOD

FIELD OF THE INVENTION

The present invention relates to database searching and particularly to a highly error-tolerant yet time-efficient database search function based on bipartite weighted matching. More particularly, a multistage database search method includes a first stage that only considers textual polygraphic frequencies and a second stage that considers the locations of the polygraph and coarsely approximates the proper alignment between the query and the database string and a third stage that provides a better approximation of the alignment. The final output of the process is a listing of suggested database records ranked by their similarity to the query.

BACKGROUND OF THE INVENTION

Over the past decade "database" has transitioned from an application used by a relatively small number of users in highly structured corporate data processing environments, to one at the center of mainstream computing. This occurred in large part because of the decade's striking advances in connectivity. The mid 80's emphasis on local area networks has been replaced with the world Internet. At the same time the set of computer users accessing databases has grown from a somewhat homogeneous and geographically localized collection to a highly diverse group spanning the globe and speaking many languages.

The present invention is a software method, performed by software instructing a computer, which addresses a central problem that is emerging as a result of these changes. That is, the problem of "robust semistructured text retrieval" for small and medium size databases. The crux of the invention resides in a function that compares two text strings returning a numerical indication of their similarity. Typically one of these strings is the user's query and the other is a string from the database. Because this function is very fast it is possible to compare the query with thousands or even hundreds of thousands of database fields while still delivering acceptable response time. Also included is a high-speed heap data structure used to track the "best matches" encountered during a search.

Semistructured text lies between fully structured databases and unconstrained text streams. A fully structured database might, for example, represent a person's name as many fields corresponding to its parts. The semistructured approach represents the name in a less formal way using a single text field. Other examples of semistructured text fields are: addresses, item names or descriptions (as in an online catalog), book or paper titles, company or institution names. Several such fields might be combined into one. For example, the query might be "problmoptimldictionry" and the record is Anderson, Optimal Bounds on the Dictionary Problem LNCS, 401, 1989.

All three of the words in the query above are misspelled, occur in the wrong order and there are no spaces separating the words. Nevertheless, the desired record is identified, using a preferred embodiment of the invention, from a listing of 50,360 paper descriptions in the field of theoretical computer science found in J. Seiferas' "A large Bibliography on Theory/Foundations of Computer Science at ftp://ftp.cs.rochester.edu, 1996–7. Author(s) name, paper title, and related information are combined into a single database text field.

Considerable variation is possible in the description of an item using a semistructured field. A person's last name might be listed first or last. The middle name might be excluded or abbreviated. The ordering of a complex name's parts is not always well determined. In principle, a policy might be established to regularize representation but, in practice, such policies rapidly become complex and confusing. Instead, the problem of directly dealing with these variations is handled by increasing the sophistication of the software that is used to compare queries with semistructured fields. Similar variations occur in user queries where the problem is perhaps greater.

An important benefit of the invention is that the queries are simple free-form expressions of what the user is looking for. There is no query language, and the comparison function is rather robust with respect to typical errors, missing or extra information, and overall ordering. Also, a preferred embodiment of the invention includes no natural-language specific considerations. It operates on byte strings and as such may be used across languages and perhaps for applications that have nothing to do with language (such as DNA comparison).

Using a 200 Mhz Pentium-Pro processor and the preferred embodiment of the invention, processing one byte of database information typically requires roughly 0.5 $\mu$s. So 100,000 fields of 30 characters can be processed in 0.15 seconds. It is in some sense a fourth generation implementation of this general approach.

Algorithms of the general type used in the present invention were introduced in the master's thesis of P. N. Yianilos entitled "The definition, computation and application of symbol string similarity functions," Emory University, Department of Mathematics, 1978, and were later used in the commercial spelling correctors of Proximity Technology Inc., and Franklin Electronic Publishers. The linguistic software components of these companies were ultimately used under license in word processing programs from hundreds of publishers, in typewriters, and in tens of millions of hand-held spelling devices.

The PF474 VLSI chip was a special purpose pipelined processor that implemented such an algorithm. The chip is described in an article entitled "A dedicated comparator matches symbol strings fast and intelligently," in Electronics Magazine, McGraw-Hill, December 1983 and in an article by S. Rosenthan entitled "The PF474—a coprocessor for string comparison," in Byte Magazine, 1984, and in U.S. Pat. No. 4,490,811 by Yianilos and Buss entitled "String Comparator Device Systems Circuit and Method." Today's software matches and even exceeds the performance of this devices—although the comparison is not entirely fair since the PF474 was clocked at only 4 Mhz. The same design implemented today would still result in a 1–2 order of magnitude hardware advantage.

The Friendly Finder software utility described by M. J. Miller in an article entitled "First look—friendly program doesn't need exact match to find database search objects," in Info World, 1987 and first introduced in 1987 by Proximity Technology, Inc. implemented the algorithm together with software accelerations and special treatment for bigrams. The result was that small database could be searched on early personal computers without using the PF474 chip. The computational heart of Friendly Finder was also made available under license and called "P2. "

A transition to the bipartite matching viewpoint took place with two articles by Buss and Yianilos, one entitled "Linear and o(n log n) time minimum-cost matching algorithms for quasi-convex tours," in the Proceedings of the 5th Annual ACM-SIAM Symposium on Discrete Algorithms, 1994, pp.

65–76, and another entitled "A bipartite matching approach to approximate string comparison and search," technical report no. 95-193, from NEC Research Institute, Inc., Princeton, N.J., and the algorithms were both improved and in some cases simplified. The result is entirely new algorithms that are still of the same family.

The present invention is the first implementation based on these new developments. The algorithms of Yianilos and Buss lead to linear time algorithms for a large class of graph cost functions including the simple linear costs used by LIKEIT. LIKEIT is a software system implementing the multistage method forming the present invention. Linear time matching algorithms for this particularly simple special case were first present in an article by R. M. Karp and S.-Y. R. Li entitled "Two special cases of the Assignment Problem" in Discrete Mathematics, 13 (1975), pp. 129–142.

A portion of the disclosure of this patent document (LIKEIT SOFTWARE) contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. v,1-83/2

An alternative approach to string comparison computes "edit distance", described in an article by Hall and Dowling entitled "Approximate String Matching," in Computing Surveys, 12, 1980, pp. 381–402 and in an article by Sankoff and Kruskal entitled "Macromolecules: The Theory and Practice of Sequence Comparison," Addison-Wesley, 1983, that is the minimum-cost transformation of one into the other via some elementary set of operations. The most common form of the approach uses weighted insertion, deletion, and substitution operations and the distance computation is a straightforward dynamic program. There are two problems that led to the present invention. First, the algorithm runs in $O(m \cdot n)$ time where m, n are the string lengths. The present method runs in $O(m+n)$. Second, the edit distance approach is highly sensitive to global permutation, e.g. changing word order. Humans frequently are not so sensitive and the invention deals well with this issue.

A similar approach, also used in effect by Friendly Finder, is to build an optimal weighted matching of the letters and multigraphs in the query, and those in the each database record. Words receive no special treatment. In this sense it is related to the document retrieval approach of M. Damashek, in an article entitled "Gauging similarity with n-grams: Language-independent categorization of text," in Science, 267, 1995, pp. 843–848 and S. Huffman and M. Damashek entitled "Aquaintance: a novel vector-space n-gram Technique for Document Categorization," in Proc. Text Retrieval Conference (TREC-3), Washington, D.C., 1995, NIST, pp. 305–310.

The automaton based approach to fast string matching introduced in an article by Knuth, Morris and Pratt entitled "Fast pattern matching in strings," in SIAM Journal on Computing, 6, 1977, pp. 323–350, deals with exact matches only. A natural generalization relaxes the requirement of exact equality and allows a bounded (and in practice small) number of errors. Each such error is typically restricted to be either an insertion, deletion, substitution, or sometimes a transposition of adjacent symbols. Given a query string, it is then possible to build an automaton to detect it, or any match within the error bounds, within a second string. The recent work of Manber and Wu, in an article entitled "GLIMPSE: A tool to search through entire file systems," in Proceedings of the Winter 1994 USENIX Conference, 1994, pp. 23–32 and in an article entitled "Fast test searching allowing errors," in Communications of the ACM, 35, 1993, pp. 83–91, demonstrate that text can be scanned at very high speeds within this framework for comparison. The present invention's framework can satisfy queries that do not fall within the practical capabilities of the automaton approach because they are too different from the desired database record. The invention and related approaches are important and effective tools for medium-size textual databases, yet still small enough to scan in their entirety for each query.

SUMMARY OF THE INVENTION

In the prior art a related low-level comparison method was used operating on single letters and digraphs, and an entirely ad hoc approach to realignment was employed.

The present invention is an extension and combination of earlier ideas to form an overall method that is highly efficient. It is a time-tapered multi-stage process in which the earliest stages are fastest and eliminate many records from further consideration.

The invention extends comparison to longer polygraphs and employs a single automaton to detect all polygraphs in a database string that are present in the query. In the preferred embodiment of the invention, the first stage employs counts of matching polygraphs to eliminate many database records from further consideration.

The invention intelligently guides realignment based on the matching that arises. The mean of these edge lengths is used to suggest the next alignment. It is then possible to adjust the matching cost for this new alignment without rescanning the strings. This "free realignment" is an important idea used by the second stage. The second stage eliminates further records from consideration but requires more CPU time than the first stage.

The invention iterates this realignment-rematching process in the third stage. The result is a more intelligent match, but requires additional CPU time.

The invention compensates for variations in query and database string length by padding them to a fixed length, but effects this padding mathematically so that the resulting computation is trivial.

The output of each stage is maintained preferably in a binary heap.

The result is that in almost all cases, the final matches returned are the same as one would receive applying the final, most discerning but slow, process stage to the entire database.

The present invention will be more clearly understood when the following description is read in conjunction with the accompanying drawings.

DETAILED DESCRIPTION

Figure 1:
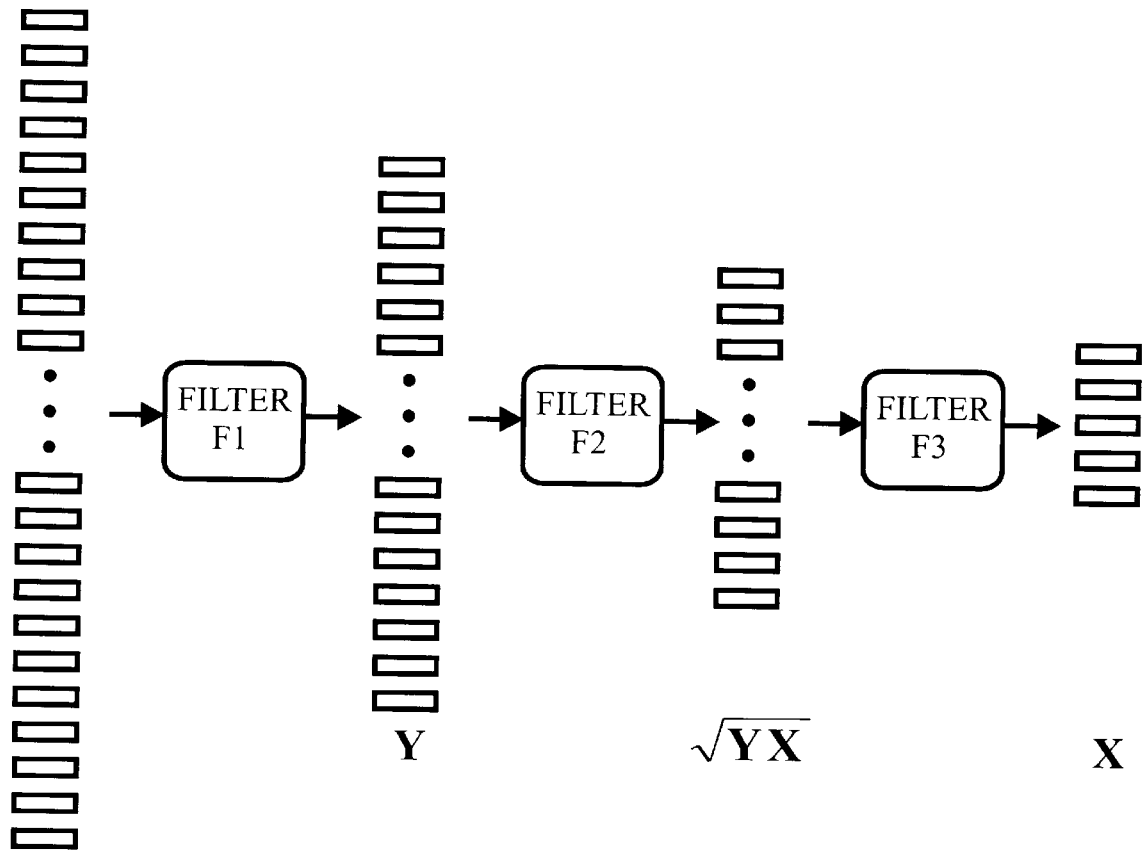
FIG. 1 is a schematic representation of the process comprising the present invention.

A highly-efficient ANSI-C facility is described for intelligently comparing a query string with a series of database strings. The bipartite weighted matching approach taken tolerates ordering violations that are problematic for simple automaton or string edit distance methods— yet common in practice. The method is character and polygraph based and does not require that words are properly formed in a query.

Database characters are processed at a rate of approximately 2.5 million per second using a 200 MHz Pentium Pro processor. A subroutine-level API is described along with an executable utility supporting both command-line and Web interface.

Processing begins by translating the null-terminated query string, character by character to an internal alphabet. Default operation collapses ASCII considerably by mapping all non-alphanumeric values to "space" and upper-case letters to their lower-case equivalents. This front end translation may be customized as described below.

The query is compared with a sequence $S_1, \ldots, S_n$ of database strings. The result of each comparison is a numerical indication of similarity, and the software keeps track of the num_matches most similar database strings encountered.

Experience shows that simple preprocessing of queries and database strings before they are passed to likeit ( ) improves results. Leading and trailing white space is deleted, repeated white space is collapsed to a single space character, and finally, a single leading and space character is inserted. Combining these steps with the default translation described above results in, for example:

| OPtimal␣␣(Dictionary), ␣ ..␣␣ | → | ␣OPTIMAL␣␣DICTIONARY␣␣␣␣ | where the repeated spaces in the final result arise from the translation process. This combined processing was found to be an effective general purpose solution, and it is performed by the utilities described below. Other preprocessing schemes and translation mappings may be more suitable for particular applications.

The LIKEIT facility reads database records and outputs those that it regards as the most similar matches to the query provided. A weighted bipartite graph matching approach is taken to the problem of quantifying "similarity". The query string is imagined to be positioned above the database string and the matching problem is to correspond features using edges of minimum total weight. In the simplest case the features comprise single letters, and the weight of an edge is the distance (in units of string position) between occurrences in the top and bottom string.

A person's sense of string similarity fairly clearly depends on higher level features such as digraphs, trigraphs, and ultimately entire words. The LIKEIT facility captures this effect by efficiently constructing several matching problems—one for single letters, another for letter pairs (digraphs), etc. Its sense of similarity is then a composite of these solutions.

The particular alignment of the query above the database string clearly affects the cost of a matching. For this reason LIKEIT treats this alignment as a variable and attempts to minimize total matching cost over it. That is, the query is imagined to slide left or right until a position resulting in minimum total matching cost is found.

The result is a rather complicated process, and despite the emphasis on efficiency, a time consuming one. For this reason the LIKEIT facility is implemented as a three stage filter, as shown in FIG. 1, in which the computation above is the final stage designated filter F3. The two earlier stages filter F1 and filter F2 approximate the similarity judgment of F3 using far less time. The F2 stage coarsely approximates the optimization over query alignment as described below. The first stage F1 approximates the matching process itself by counting matching polygraphs—taking no account of their position.

Each of these stages, F1, F2 and F3, acts as a filter of the input database, outputting fewer records than are input. The number of records output from the first filter is denoted Y and the number delivered by the last is denoted X, where Y>>X. The size of the output of F2 interpolates between the outputs of F1 and F3. The LIKEIT facility sets Y to the greater of 10·X and 1000. The effect of this tapered filter approach is that the final output is (in practice) as though the full algorithm, F3 were applied to every database record. The stages compute increasing effective but CPU-intensive notions of similarity. The records output from each filter stage are maintained in a binary heap. The implementation is simple and fast. As a result, heap operations represent a negligible portion of the overall CPU time.

Each of the three filter stages operate on the query string and database strings as a series of polygraphs of various lengths (single letters are 1-polygraphs). Matching edges can exist only between polygraphs that occur in both the query string and the database string under consideration. Thus, all other data record polygraphs may be disregarded.

The present approach is to build a finite state machine (FSM) based on the query string which detects all polygraphs (up to some fixed length) in a database record that also occur in the query string. The machine changes state as each database record character is presented. The states correspond to the longest trailing polygraph that is also present in the query string.

The machine's construction is straightforward but involved and is described in the distribution file fsm.doc. Consideration was given to processing the database once using this machine and saving the result. But because far fewer records are considered by F2, F3 than by F1, and because the machine is very fast when compared with F2, F3, the records are reprocessed for each filter stage.

The matching filters F1, F2, F3 operate on polygraphs identified by the FSM. Default operation limits attention to polygraphs of lengths 3–6 for filter F1, and lengths 1–6 for F2, F3.

In all filters a form of normalization is required so that matching scores are comparable in the presence of variable length queries and database strings. This normalization may be regarded as "padding" both query and database string to some large length L that in the default is preferably 1024. In all cases the effect is easily computed and the padding is never actually performed.

Filter F1 counts matching polygraphs. Initialization identifies all polygraphs in the query string within the requested range (3–6 by default). The count of each within the query string is recorded. As the FSM processes database string characters and polygraphs are identified, F1 counts "matches" up to the limit imposed by each polygraph's multiplicity in the query string. For example, if "ing" occurs three times in the query string, then only the first three occurrences in the database string contribute to the match count. Database-string polygraphs that do not occur in the query string are unmatched by definition. Unmatched polygraphs also include those that were not counted because they exceeded the query string multiplicity limit.

Filter F1 takes no account of the relative position of matching polygraphs. It assigns a constant cost 0.5 L to matching polygraphs, and cost L to each pair that does not match. As such it is a relaxation of the later matching stage to trivial constant cost functions. Because position is irrelevant, alignment is not considered for F1. The final scores computed by F1, F2, F3 combine scores for each polygraph length and weight them linearly, i.e. length 1–6 receive weights 1–6 respectively.

The next stage, F2, begins with a left-aligned query, and decomposes the matching problem into subproblems for each "level" as defined in Buss and Yianilos, "Linear and o(nlogn) time minimum-cost matching algorithms for quasi-convex tours," supra. Each such level includes polygraph occurrences that alternate between the query string and database string. If the number of occurrences is even, the matching is uniquely defined. If the number of occurrences is odd, then LIKEIT approximates the optimal matching by omitting either the first or last occurrence. The entire process is implemented without actually recording the matching edges—only costs are propagated online as database characters are processed. Investing only a little additional time yields the optimal matching described in Buss and Yianilos, "A bipartite matching approach to approximate string comparison and search," supra—also in an online fashion—but this is not implemented in LIKEIT.

Having produced a matching, a single approximate realignment step is performed. This is accomplished by keeping track of the average edge length during processing, and mathematically repositioning the query string so that the average length is as near as possible to zero. It is important to note that the matching itself is unchanged—edges are simply expanded or contracted to account for the realignment. For this reason we refer to this as a "free realignment".

The final filter F3 begins as does filter F2 but after each realignment a new matching solution is constructed. This realignment-rematching step is performed a predetermined number of times, preferably three times, or until the score fails to improve. The mean-length approach to realignment taken by LIKEIT is easily implemented but we remark that the proper computation instead focuses on median length.

The facility's time performance is measured by applying the likeit program to the database of Seiferas, supra. This database is a listing of 50,360 papers in theoretical computer science. Each line gives the authors, title, journal or conference, and date. The fields were reordered to match this description and a 'I' was added between them. The resulting file is 4,278,967 bytes.

The timings are made using an Intel Pentium Pro 200 MHz processor with a 512 K L2 cache under Linux version 2.0.27. The distribution was compiled using gcc—03 version 2.7.2.1.

Focus is made on the time required to process a single character of database text since this statistic enables application designers to quickly compute response time. This time is, however, not constant and the primary variables affecting it are the query's length and the number of best matches requested. Experiments verify that there is in practice much less sensitivity to the query's particular value, or the database's specific content.

TABLE 1

| Query | Filter | # Matches Returned | | | | |
|---|---|---|---|---|---|---|
| | | 1 | 5 | 25 | 100 | 500 |
| Q1 | F1 | 285 | 283 | 283 | 280 | 287 |
| | F2 | 40 | 42 | 42 | 42 | 168 |
| | F3 | 2 | 5 | 12 | 23 | 164 |
| | Total | 327 | 330 | 337 | 345 | 619 |
| Q2 | F1 | 301 | 299 | 299 | 301 | 306 |
| | F2 | 68 | 70 | 70 | 68 | 301 |
| | F3 | 12 | 21 | 44 | 108 | 285 |
| | Total | 381 | 390 | 413 | 477 | 892 |

TABLE 1-continued

| Query | Filter | # Matches Returned | | | | |
|---|---|---|---|---|---|---|
| | | 1 | 5 | 25 | 100 | 500 |
| Q3 | F1 | 337 | 337 | 334 | 339 | 346 |
| | F2 | 98 | 98 | 96 | 98 | 437 |
| | F3 | 14 | 26 | 54 | 108 | 285 |
| | Total | 449 | 461 | 484 | 545 | 1068 |

Q1: Optimal
Q2: Optimal Dictionary Problem
Q3: Andersson, Optimal Bounds on the Dictionary Problem Table 1 shows processing time (nanoseconds) per character of database text for three queries of increasing length and requests for between 1 and 500 best matches. The total time as well as times for each filter stage are shown. For example, 413 ns per database character are required for query Q2 applied to the test database, where 25 best matches are requested. The response time for this query is then 413 ns $\times 4,278,967 \approx 1.77$ seconds. It is also convenient to compute the processing rate $1/413$ ns $\approx 2.4$ million characters per second.

Table 1 also shows times for the three filter stages in the LIKEIT process. The patterns evident in this table are consistent with the algorithm's design. Regarding the qualitative nature of the timings, it will be noted that the F1 time is essentially constant for each query and varies little between queries. This is expected because the role of F1 amounts to counting polygraphs in database records and there is very little dependency on the query. Filter 2 time depends rather strongly on query string length since very similar processing takes place for each character of the database and query strings. For a fixed query string F2 is essentially constant through 100 requested matches—but has increased considerably at 500. This is explained by the choice to set the number of matches output by F1 to the greater of ten times the number of requested matches, and 1000. So up to 100 requested matches, F1 always outputs 1000 candidates for consideration by F2. Requesting 500 matches forces F1 to output 5000 candidates thus increasing almost linearly the F2 time required. For a fixed query it is expected that F3 time will increase with the number of candidates output by F2. For table's values of 1, 5, 25, 100, 500, filter F3 outputs 31, 70, 125, 316, and 1581 records respectively as determined from the search "problmoptiml-dictionry". Analysis of F3 time is complicated by the variable number of realignment steps performed. It is expected, however, fewer such steps to be necessary as query string length approaches the length of the database string. The table's F3 times are consistent with these two observations.

In summary, for each query string the time varies by roughly 2:1 as the number of requested matches ranges from 1 to 500. The variation is somewhat less than this within columns. The corner-to-corner variation is just above 3:1. Excluding the 500 matches column the variation is much smaller.

Application designers can approximate performance well, at least for budgetary estimation purposes, by simply assuming:

Each database character requires $\approx 400$ ns to process, corresponding to a rate of 2.5 MB/second.

However, this assumption fails in extreme cases such as databases of very short records. Here, per-record overhead dominates.

While there has been described and illustrated a preferred method of performing a multistage intelligent string comparison, it will be apparent to those skilled in the art that variations and modifications are possible without deviating from the broad teachings and spirit of the present invention which shall be limited solely by the scope of the claims appended hereto.

What is claimed is:

1. A method of searching a database for a query comprising the steps of:
   (a) providing a database of strings of characters;
   (b) providing a query string;
   (c) identifying polygraphs that occur in said query string and also in said database strings;
   (d) providing a cost to each said identified polygraph;
   (e) positioning the query string relative to each database string;
   (f) matching polygraph occurrences in the query string with those in each database string, the cost of matching providing a numerical indication of the similarity between said query string and each said database string;
   (g) realigning said query string to reduce the cost by examining edges present in the matching solution;
   (h) repeating said matching and said realigning a predetermined number of times or until the cost of matching fails to improve; and
   (i) repeating the steps (c) to (h) above for each database string for the purpose of identifying those database strings most similar to said query string.

2. A method of searching as set forth in claim 1, where polygraphs are longer than a predetermined fixed minimum length and shorter than a predetermined fixed maximum length.

3. A method of searching as set forth in claim 1, where the query string is initially left-aligned with each database string.

4. A method of searching as set forth in claim 1, where said matching is approximated by relying only on the number of matching of said polygraph.

5. A method of searching as set forth in claim 1, where said matching is approximately identified by dividing matching polygraphs into levels so that occurrences alternate between said query string and database string such that: when the number of occurrences is even, the matching is uniquely defined and when the number of occurrences is odd, omitting either the first or last occurrence.

6. A method of searching as set forth in claim 1, where said matching is identified by a quasi-convex matching method.

7. A method of searching as set forth in claim 1, where said examination of edges comprises computing the mean of the edge lengths.

8. A method of searching as set forth in claim 1, where said examination of edges comprises computing the median of the edge lengths.

9. A method of searching as set forth in claim 1, where said matching following realigning is approximated by mathematically adjusting edge lengths.

10. A method of searching as set forth in claim 1, where said identification of most similar database strings is performed using a heap data-structure.

11. A method of searching as set forth in claim 1, where said query strip and database string are mathematically padded to a predetermined length.

12. A multistage method of searching a database for a query comprising the steps of:
    providing a database of strings of characters;
    providing a query string;
    processing each database string using a first method selected on the basis of computational time efficiency for identifying database strings that are similar to said query string;
    processing said similar database strings using a second method selected to be more accurate but less time efficient than said first method for identifying smaller numbers of database strings that are similar to said query string, and
    providing final identification of most similar database strings based on the result of processing said similar database strings.

13. A multistage method of searching as set forth in claim 12, where said first method and said second method are selected from the group consisting of relying on the number of matchings of a polygraph, dividing matching polygraphs into levels so that occurrences alternate between said query string and database string such that when the number of occurrences is even, the matching is uniquely defined and when the number of occurrences is odd, omitting either the first or last occurrences, quasi-convex matching, and mathematically adjusting edge length.

14. A multistage method of searching as set forth in claim 13, where said providing final identification of most similar database strings is performed using a heap data-structure.

15. A multistage method of searching as set forth in claim 12, where said providing final identification of most similar database strings is performed using a heap data-structure.

* * * * *

UNITED STATES PATENT AND TRADEMARK OFFICE
CERTIFICATE OF CORRECTION

PATENT NO. : 5,978,797
DATED : November 2, 1999
INVENTOR(S) : Yianilos

It is certified that error appears in the above-identified patent and that said Letters Patent is hereby corrected as shown below:

<u>Column 3,</u>
Line 24, after v,1-83/2 insert the attached Appendix A.

Signed and Sealed this

Nineteenth Day of February, 2002

Attest:

JAMES E. ROGAN
Attesting Officer        Director of the United States Patent and Trademark Office

APPENDIX A

(C) COPYRIGHT 1997, NEC Research Institute -- all rights reserved.

```
Jun 18 12:15 1997  Makefile.distrib Page 1

LikeIt -- Makefile for public distribution

####################################################################
The macros in this section may be adjusted by the user   ###
####################################################################

Source code #defines:

# Operating system type
OS_TYPE         = linux
#OS_TYPE        = sunos4
OS_TYPE        = solaris EXTRA_LIBS      =
For Solaris, choose use the definition below
#EXTRA_LIBS     = -lsocket -lnsl

# Which machine the likeitd or in.likeitd daemon will run on
SERVERADDR      = '"frege.nj.nec.com"'

# Which port the likeitd or in.likeitd daemon will listen on;
# select this in consultation with your system administrator.
SERVERPORT      = 5051

# Timeout (secs) for all socket communications
TIMEOUT_VALUE   = 60

Compiler invocation
CC              = gcc -ansi -pedantic -Wall

Compiler flags
CFLAGS          = -g
#CFLAGS         = -O3 -DNDEBUG -g

Adjust depending on whether archives need to be ranlib's on your machine
#RANLIB         = :
RANLIB          = ranlib
####################################################################

DFLAGS          = -D${OS_TYPE} -DSERVERADDR=${SERVERADDR} -DSERVERPORT=${SERVERP

VERSION         = 1.2
DISTRIB         = likeit-${VERSION}

CO              = co

LLIBS           = -lm ${EXTRA_LIBS}

ARCHIVE         = liblikeit.a
```

```
Jun 18 12:15 1997  Makefile.distrib Page 2

ARCHIVE_SRCS     = likeit.c charmap.c fsm.c polycount.c qconvex.c invtab.c \
                   heap.c array.c mem.c timer.c utils.c
ARCHIVE_OBJS     = likeit.o charmap.o fsm.o polycount.o qconvex.o invtab.o \
                   heap.o array.o mem.o timer.o utils.o
ARCHIVE_HDRS     = likeit_sys.h fsm.h invtab.h heap.h array.h common.h LIKEIT_SRCS      = likeit_prog.c state.c data.c cgi.c display.c
LIKEIT_OBJS      = likeit_prog.o state.o data.o cgi.o display.o
LIKEIT_HDRS      = likeit_prog.h likeit.h likeit_expert.h common.h LIKEITD_SRCS     = svr_main.c svr_data.c ipc.c ipcutils.c error.c
LIKEITD_OBJS     = svr_main.o svr_data.o ipc.o ipcutils.o error.o
LIKEITD_HDRS     = clisvr.h common.h error.h systemtype.h ipc.h LIKEITSTUB_SRCS  = cli_main.c ipc.c ipcutils.c error.c
LIKEITSTUB_OBJS  = cli_main.o ipc.o ipcutils.o error.o
LIKEITSTUB_HDRS  = clisvr.h common.h error.h systemtype.h ipc.h SOURCES          = ${ARCHIVE_SRCS}       \
                   ${LIKEIT_SRCS}        \
                   ${LIKEITD_SRCS} ${LIKEITSTUB_SRCS}

TARGETS          = ${ARCHIVE}            \
                   likeit likeit.cgi     \
                   likeitd in.likeitd likeitstub.cgi all:             ${TARGETS}

${ARCHIVE}:      ${ARCHIVE_OBJS}
        ar rc ${ARCHIVE} ${ARCHIVE_OBJS}
        ${RANLIB} $@ likeit:          ${LIKEIT_OBJS} ${ARCHIVE}
        ${CC} ${LFLAGS} -o $@ ${LIKEIT_OBJS} ${ARCHIVE} ${LLIBS} likeit.cgi:      likeit
        cp likeit likeit.cgi likeitd:         ${LIKEITD_OBJS} ${ARCHIVE}
        ${CC} ${LFLAGS} -o $@ ${LIKEITD_OBJS} ${ARCHIVE} ${LLIBS} in.likeitd:      likeitd
        cp likeitd in.likeitd likeitstub.cgi:  ${LIKEITSTUB_OBJS} ${ARCHIVE}
        ${CC} ${LFLAGS} -o $@ ${LIKEITSTUB_OBJS} ${ARCHIVE} ${LLIBS}

%.o:             %.c
```

Jun 18 12:15 1997  Makefile.distrib Page 3

```
        ${CC} ${CFLAGS} ${DFLAGS} -c $<
clean:
        @rm -f *.o ${TARGETS} core
```

```
Jun 11 17:11 1997  likeit.c Page 1 include <stdio.h>
include <stdlib.h>
#include <stdarg.h>
#include <ctype.h>
#include <string.h>
#include <assert.h>
#include "common.h"
#include "likeit_sys.h"

extern double rint(double);

#define TIME_MATCH       0

/* Parameters structure */
typedef struct likeit_params_strct {
        UCHAR    *query;          /* Query string */
        CHARMAP  charmap;         /* User's character mapping function */
        RECFUNC  recfunc;         /* User's record retrieval function */
        int      num_matches;     /* Number of records requested */
        int      max_record_len;  /* Max record len */
        BOOL     dflt_filters;    /* Using default filters? */
        int      num_filters;     /* Number of filters */
        FILTER   *filters;        /* Sequence of filters */
} PARAMS;

#define USING_DEFAULT_FILTERS(params)    ((params)->dflt_filters)

static BOOL      Verbose = FALSE;

static const char *FilterTypeNames[LKT_FILTER_NUM_TYPES] = {
        "POLYCOUNT",
        "QCONVEX_1",
        "QCONVEX_2"
};

#define SELF_TEST_0_LOOP         5
define SELF_TEST_1_LOOP         100 static BOOL      InSelfTest = FALSE;
static unsigned  SelfTestSeed = 0;
static unsigned  SelfTestRec1Seed;
static UCHAR     SelfTestRecord[256];
static int       SelfTestBLen;
static int       SelfTestBAlpha;
static int       SelfTestNumRecords;
static unsigned  SelfTestChecksums[2] = { 95393273U, 2374911050U };

/* Local procedures */
static int       self_test_charmap( int c );
```

```
Jun 11 17:11 1997  likeit.c Page 2 static UCHAR *   self_test_recfunc( int recnum );
static void      self_test_make_string( UCHAR *s, int blen, int balpha );
static unsigned int    self_test_get_seed( void );
static void      self_test_set_seed( unsigned int seed );
static UCHAR     self_test_random_byte( void );
static PARAMS *  create_params_struct( UCHAR *query, RECFUNC recfunc,
                                       int num_matches, EXPERT *expert );
static void      print_params_struct( PARAMS *params );
static void      destroy_params_struct( PARAMS *params );
static void      adjust_heap_sizes( PARAMS *params, int output0 );
static const char *     filter_name( int type );
static HEAP *    filter_run( int fnum, PARAMS *params, HEAP *inheap );

int
likeit( UCHAR *query, RECFUNC recfunc, void *expertp, int num_matches,
        int *matches, double *scores )
{
        int     f, i, actual_matches;
        EXPERT  *expert;
        PARAMS  *params;
        HEAP    *heap;
        HEAPKEY key;
        HEAPID  id;

#if TIME_MATCH
        double  cputime, time;
endif if (!InSelfTest) {
                if (!likeit_self_test(0)) {
                        printf("likeit: Self-test failed\n");
                        exit(1);
                }
        } expert = expertp;

params = create_params_struct(query, recfunc, num_matches, expert);
        if (Verbose) {
                print_params_struct(params);
        } if TIME_MATCH
        cputime = 0.0;
endif heap = NULL;

for (f=0 ; f < params->num_filters ; f++) {
```

Jun 11 17:11 1997   likeit.c Page 3

```c
#if TIME_MATCH
                fprintf(stderr, "Filter %d:  ", f+1);
                (void) cpu_interval();
endif heap = filter_run(f, params, heap);

if TIME_MATCH
                time = cpu_interval();
                fprintf(stderr, "%.2f seconds\n", time);
                cputime += time;
endif if (f == 0 && USING_DEFAULT_FILTERS(params)) {
                        adjust_heap_sizes(params, heap_num_items(heap));
                }
        } heap_sort(heap);        /* Sort final output heap */

/* Copy record ids and match scores into
                                   user's output arrays.
                                 */
        for (i=0 ; i < params->num_matches ; i++) {
                if (!heap_item(heap, i+1, &key, &id)) {
                        break;
                } matches[i] = id;
                scores[i]  = (double) key;
        }
        actual_matches = i;

heap_destroy(heap);
        destroy_params_struct(params);

return actual_matches;
} int
likeit_self_test( int test_type )
{
        int     i, j, n;
        UCHAR   query[32];
        int     matches[10];
        double  score, scores[10];

EXPERT  expert;
```

```
Jun 11 17:11 1997  likeit.c Page 4 unsigned int    checksum;

InSelfTest = TRUE;

expert.char_map      = self_test_charmap;
        expert.max_record_len = 128;
        expert.num_filters   = LKT_DEFAULT_FILTERS;

checksum = 0;
        self_test_set_seed(0);

switch (test_type) {
        case 0:
                for (i=0 ; i < SELF_TEST_0_LOOP ; i++) {
                        self_test_make_string(query, 3, 3);
                        SelfTestRec1Seed  = self_test_get_seed();
                        SelfTestBLen      = 5;
                        SelfTestBAlpha    = 3;
                        SelfTestNumRecords = 10;
                        n = likeit(query, self_test_recfunc, &expert,
                                   10, matches, scores);

checksum += n;
                        for (j=0 ; j < 10 ; j++) {
                                checksum += (j+1) * matches[j];
                                score = rint(scores[j]);
                                assert(score == scores[j]);
                                checksum += (j+1) * ((int) score);
                        }
                }
                break;
        case 1:
                for (i=0 ; i < SELF_TEST_1_LOOP ; i++) {
                        self_test_make_string(query, 5, 7);
                        SelfTestRec1Seed  = self_test_get_seed();
                        SelfTestBLen      = 7;
                        SelfTestBAlpha    = 7;
                        SelfTestNumRecords = 1000;
                        n = likeit(query, self_test_recfunc, &expert,
                                   10, matches, scores);

checksum += n;
                        for (j=0 ; j < 10 ; j++) {
                                checksum += (j+1) * matches[j];
                                score = rint(scores[j]);
                                assert(score == scores[j]);
                                checksum += (j+1) * ((int) score);
                        }
                }
                break;
```

Jun 11 17:11 1997   likeit.c Page 5

```c
        }

/* printf("checksum = %u\n", checksum); */

InSelfTest = FALSE;

return (checksum == SelfTestChecksums[test_type]);
} static int
self_test_charmap( int c )
{
        return c;
} static UCHAR *
self_test_recfunc( int recnum )
{
        if (recnum == 1) {
                self_test_set_seed(SelfTestRec1Seed);
        } if (recnum > SelfTestNumRecords) {
                return NULL;
        } self_test_make_string(SelfTestRecord, SelfTestBLen, SelfTestBAlpha);

return SelfTestRecord;
}

/* Generate random string, of length less than 2^blen, from an alphabet
   of size 2^balpha.
 */
static void
self_test_make_string( UCHAR *s, int blen, int balpha )
{
        int     slen;
        UCHAR   mask;

mask = ((1 << blen) - 1);
        slen = (int)(self_test_random_byte() & mask);

mask = ((1 << balpha) - 1);
        while (slen--) {
                *s++ = (self_test_random_byte() & mask);
        }
        *s = 0;
}
```

```
Jun 11 17:11 1997   likeit.c Page 6 static unsigned int
self_test_get_seed( void )
{
        return SelfTestSeed;
} static void
self_test_set_seed( unsigned int seed )
{
        SelfTestSeed = seed;
}

/* Generate random *non-zero* unsigned chars. */ static UCHAR
self_test_random_byte( void )
{
        SelfTestSeed = (SelfTestSeed * 4096 + 150899) % 714025;
        return 1 + (255 * SelfTestSeed)/714025;
}

/* Create a working parameter structure, based on the default parameters,
   or on parameters supplied by the user.
 */
static PARAMS *
create_params_struct( UCHAR *query, RECFUNC recfunc, int num_matches,
                      EXPERT *expert )
{
        int     i, qlen;
        PARAMS  *params;

params = mem_alloc(sizeof(PARAMS));

/* Copy query */
        qlen   = ustrlen(query);
        params->query = mem_alloc((qlen+1)*sizeof(UCHAR));
        memcpy(params->query, query, qlen+1);

params->recfunc     = recfunc;
        params->num_matches = num_matches;

if (!expert || expert->char_map == LKT_DEFAULT_CHAR_MAP) {
                params->charmap = likeit_default_char_map;
        } else {
                params->charmap = expert->char_map;
        } if (!expert || expert->max_record_len == LKT_DEFAULT_MAX_RECORD_LEN) {
                params->max_record_len = LKT_DEFAULT_MAX_RECORD_LEN;
```

Jun 11 17:11 1997  likeit.c Page 7

```c
        } else {
                params->max_record_len = expert->max_record_len;
        } if (!expert || expert->num_filters == LKT_DEFAULT_FILTERS) {
                params->dflt_filters = TRUE;
                params->num_filters  = 3;
                params->filters      = mem_alloc(3*sizeof(FILTER));

params->filters[0].type = LKT_FILTER_POLYCOUNT;
                params->filters[0].qmin = 3;
                params->filters[0].qmax = 6;

params->filters[1].type = LKT_FILTER_QCONVEX_1;
                params->filters[1].qmin = 1;
                params->filters[1].qmax = 6;

params->filters[2].type = LKT_FILTER_QCONVEX_2;
                params->filters[2].qmin = 1;
                params->filters[2].qmax = 6;

adjust_heap_sizes(params, -1);

} else {
                params->dflt_filters = FALSE;
                params->num_filters  = expert->num_filters;
                params->filters      = mem_alloc(params->num_filters
                                                  * sizeof(FILTER));

for (i=0 ; i < params->num_filters ; i++) {
                        params->filters[i] = expert->filters[i];
                }
        } return params;
}

/* Print contents of a parameters structure. */ static void
print_params_struct( PARAMS *params )
{
        int     i;

fprintf(stderr, "Query: `%s'\n", params->query);
        fprintf(stderr, "Number of items requested: %d\n", params->num_matches);
        fprintf(stderr, "Max record length: %d\n", params->max_record_len);

fprintf(stderr, "Filter sequence:\n");
```

Jun 11 17:11 1997   likeit.c Page 8

```c
        for (i=0 ; i < params->num_filters ; i++) {
            fprintf(stderr, "\t%-10s [%d,%d] hmax=%d\n",
                    filter_name(params->filters[i].type),
                    params->filters[i].gmin,
                    params->filters[i].gmax,
                    params->filters[i].hmax);
        }
}

/* Destroy a parameters structure. */ static void
destroy_params_struct( PARAMS *params )
{
        mem_free(params->query);
        mem_free(params->filters);
        mem_free(params);
}

/* Adjust output heap sizes of default filters.  We want the output of the
   last filter (filter 2) to be the number of records requested by the
   user (X).  The output of the first filter (filter 0) should be 10 times
   this number, or 1000 records, whichever is greater.

Filter 0 outputs:    Y = MAX(1000, 10 * X)
   Filter 1 outputs:    X * sqrt(Y / X)
   Filter 2 outputs:    X If filter 0 has already been run (output0 != -1), we know the actual size
   of its output heap.  If this number is less than the originally calculated
   Y, then we have to adjust downward the heap size for filters 1 and 2.  We
   do our best to make the heap sizes distinct numbers.
*/ static void
adjust_heap_sizes( PARAMS *params, int output0 )
{
        int     hmax0, hmax1, hmax2;

hmax0 = MAX(1000, 10 * params->num_matches);
        hmax1 = params->num_matches;
        hmax2 = params->num_matches;

if (output0 != -1) {
                hmax0 = MIN(hmax0, output0);
                hmax2 = MIN(hmax0, params->num_matches);
        } if (hmax0 > hmax2) {
```

Jun 11 17:11 1997  likeit.c Page 9

```c
                        hmax1 *= (int) rint(sqrt(((double)(hmax0)) / ((double)hmax2)));
                } params->filters[0].hmax = hmax0;
                params->filters[1].hmax = hmax1;
                params->filters[2].hmax = hmax2;
        }

/* Return the name of the filter of the given type. */ static const char *
        filter_name( int type )
        {
                return FilterTypeNames[type];
        }

/* Run one of the filters in the filter sequence specified in params,
           and output the results in a heap created by this routine.  If inheap
           is non-NULL, only the records in this heap are input to the filter.
           If inheap is NULL, all records returnable by the user's record function
           are input to the filter.
         */
        static HEAP *
        filter_run( int fnum, PARAMS *params, HEAP *inheap )
        {
                int     type, maxreclen, gmin, gmax, hmax;
                UCHAR   *query;
                CHARMAP charmap;
                RECFUNC recfunc;
                HEAP    *outheap;

type = params->filters[fnum].type;
                gmin = params->filters[fnum].gmin;
                gmax = params->filters[fnum].gmax;

hmax = params->filters[fnum].hmax;
                outheap = heap_create(hmax);

query    = params->query;
                charmap  = params->charmap;
                recfunc  = params->recfunc;
                maxreclen = params->max_record_len;

switch (params->filters[fnum].type) { case LKT_FILTER_POLYCOUNT:
                        likeit_filter_PolyCount(query, charmap, recfunc, maxreclen,
                                                gmin, gmax,
                                                inheap, outheap);
```

```
Jun 11 17:11 1997  likeit.c Page 10 break;
                case LKT_FILTER_QCONVEX_1:
                        likeit_filter_QConvex_1(query, charmap, recfunc, maxreclen,
                                                gmin, gmax,
                                                inheap, outheap);
                        break;
                case LKT_FILTER_QCONVEX_2:
                        likeit_filter_QConvex_2(query, charmap,
                                                recfunc, maxreclen, gmin, gmax,
                                                inheap, outheap);
                        break;
                } if (inheap) {
                        heap_destroy(inheap);
                } return outheap;
        }

/* Initialize record stream.  This routine returns an integer handle that
   will be used to fetch the next record (the handle is updated for each
   record.  If "inheap" is non-NULL, only the records whose record numbers
   are on the heap will be delivered.  The user's recfunc function is
   called to fetch the actual record string.
 */
int
likeit_init_records( RECFUNC recfunc, HEAP *inheap )
{
        return 0;
}

/* Return next record to current filter; return -1 if no more records.
   If inheap is non-NULL, rhandle is interpreted as the heap item number
   of the last record returned.  If inheap is NULL, rhandle is interpreted
   as the actual record number of the last record returned.
 */
int
likeit_next_record( int rhandle, RECFUNC recfunc, HEAP *inheap, UCHAR **record,
                    int *recnum )
{
        int     rec;
        HEAPID  *ids;

if (inheap) {
                if (++rhandle > heap_num_items(inheap)) {
                        return -1;
                }
```

Jun 11 17:11 1997  likeit.c  Page 11

```c
                ids = heap_item_ids(inheap);
                rec = ids[rhandle];

*record = (*recfunc)(rec);
                *recnum = rec;

return rhandle;

} else {
                rec = ++rhandle;

if (!(*record = (*recfunc)(rec))) {
                        return -1;
                }

*recnum = rec;

return rhandle;
        }
}
/* Add item represented by (key, id) to the given heap.  If the item's key
   is not better (less) than the worst key on the heap, then it is not added
   (unless the heap is less than full).  The routine returns whether or not
   the item was actually added to the heap.
 */
BOOL
likeit_add_to_heap( HEAP *heap, HEAPKEY key, HEAPID id )
{
        int     nitems;
        HEAPKEY worstkey;

nitems = heap_num_items(heap);
        worstkey = nitems ? heap_max_key(heap) : HEAPKEY_MAX;

/* If output heap is not full, add to heap. */
        if (nitems < heap_max_items(heap)) {
                heap_insert(heap, key, id);
                return TRUE;

/* If output heap is full, replace top
                                   (highest-cost) item in heap.
                                 */
        } else if (key < worstkey) {
                heap_remove(heap, NULL, NULL);
                heap_insert(heap, key, id);
                return TRUE;
        }
```

```
Jun 11 17:11 1997  likeit.c Page 12 return FALSE;
} if 0

/* OLD default character map */ int
likeit_default_char_map( int c )
{
        if (!isalnum(c)) {
                return ' ';
        } else {
                return tolower(c);
        }
}
endif
```

Jun 12 14:39 1997  charmap.c  Page 1

```c
#include <stdio.h>
include <stdlib.h>
#include <ctype.h>
#include <assert.h>
#include "common.h"

static UCHAR    LikeitDefaultCharMap[256] = {

/*  NUL  SOH  STX  ETX  EOT  ENQ  ACK  BEL  */
    '\0', ' ', ' ', ' ', ' ', ' ', ' ', ' ',

/*  BS   HT   NL   VT   NP   CR   SO   SI   */
    ' ', ' ', ' ', ' ', ' ', ' ', ' ', ' ',

/*  DLE  DC1  DC2  DC3  DC4  NAK  SYN  ETB  */
    ' ', ' ', ' ', ' ', ' ', ' ', ' ', ' ',

/*  CAN  EM   SUB  ESC  FS   GS   RS   US   */
    ' ', ' ', ' ', ' ', ' ', ' ', ' ', ' ',

/*  SP   !    "    #    $    %    &    '    */
    ' ', ' ', ' ', ' ', ' ', ' ', ' ', ' ',

/*  (    )    *    +    ,    -    .    /    */
    ' ', ' ', ' ', ' ', ' ', ' ', ' ', ' ',

/*  0    1    2    3    4    5    6    7    */
    '0', '1', '2', '3', '4', '5', '6', '7',

/*  8    9    :    ;    <    =    >    ?    */
    '8', '9', ' ', ' ', ' ', ' ', ' ', ' ',

/*  @    A    B    C    D    E    F    G    */
    ' ', 'a', 'b', 'c', 'd', 'e', 'f', 'g',

/*  H    I    J    K    L    M    N    O    */
    'h', 'i', 'j', 'k', 'l', 'm', 'n', 'o',

/*  P    Q    R    S    T    U    V    W    */
    'p', 'q', 'r', 's', 't', 'u', 'v', 'w',

/*  X    Y    Z    [    \    ]    ^    _    */
    'x', 'y', 'z', ' ', ' ', ' ', ' ', '_',

/*  `    a    b    c    d    e    f    g    */
    ' ', 'a', 'b', 'c', 'd', 'e', 'f', 'g',

/*  h    i    j    k    l    m    n    o    */
    'h', 'i', 'j', 'k', 'l', 'm', 'n', 'o',
```

```
Jun 12 14:39 1997   charmap.c Page 2

/*    p     q     r     s     t     u     v     w    */
     'p',  'q',  'r',  's',  't',  'u',  'v',  'w',

/*    x     y     z     {     |     }     ~    DEL   */
     'x',  'y',  'z',  ' ',  ' ',  ' ',  ' ',  ' ',

/*    --    --    --    --    --    --    --    --   */
     ' ',  ' ',  ' ',  ' ',  ' ',  ' ',  ' ',  ' ',

/*    --    --    --    --    --    --    --    --   */
     ' ',  ' ',  ' ',  ' ',  ' ',  ' ',  ' ',  ' ',

/*    --    --    --    --    --    --    --    --   */
     ' ',  ' ',  ' ',  ' ',  ' ',  ' ',  ' ',  ' ',

/*    --    --    --    --    --    --    --    --   */
     ' ',  ' ',  ' ',  ' ',  ' ',  ' ',  ' ',  ' ',

/*    --    í     ó     ú     ñ     Ñ     ·     °    */
     ' ',  'i',  'o',  'u',  'n',  'N',  ' ',  ' ',

/*    ¿     ⌐     ¬     ½     ¼     ¡     «     »    */
     ' ',  ' ',  ' ',  ' ',  ' ',  ' ',  ' ',  ' ',

/*    ░     ▒     ▓     │     ┤     ╡     ╢     ╖    */
     ' ',  ' ',  ' ',  ' ',  ' ',  'u',  ' ',  ' ',

/*    ╕     ╣     ║     ╗     ╝     ╜     ╛     ┐    */
     ' ',  ' ',  ' ',  ' ',  ' ',  ' ',  ' ',  ' ',

/*    └     ┴     ┬     ├     ─     ┼     ╞     ╟    AE ligature? */
     'a',  'a',  'a',  'a',  'a',  'a',  'a',  'c', /*    ╚     ╔     ╩     ╦     ╠     ═     ╬     ╧    */
     'e',  'e',  'e',  'e',  'i',  'i',  'i',  'i', /*    ╨     ╤     ╥     ╙     ╘     ╒     ╓     ╫    Eth? */
     ' ',  'n',  'o',  'o',  'o',  'o',  'o',  ' ', /*    ╪     ┘     ┌     █     ▄     ▌     ▐     ▀    THORN? */
     'o',  'u',  'u',  'u',  'u',  'y',  't',  's', /*    α     ß     Γ     π     Σ     σ     µ     τ    ae ligature? */
     'a',  'a',  'a',  'a',  'a',  'a',  'a',  'c', /*    Φ     Θ     Ω     δ     ∞     φ     ε     ∩    */
     'e',  'e',  'e',  'e',  'i',  'i',  'i',  'i', /*    ≡     ±     ≥     ≤     ⌠     ⌡     ÷     ≈    eth? */
     ' ',  'n',  'o',  'o',  'o',  'o',  'o',  ' ',
```

Jun 12 14:39 1997   charmap.c Page 3

```
/*     º    .    .    √    ⁿ    ²    ■           thorn? */
    'o', 'u', 'u', 'u', 'u', 'y', 't', 'y'  };

int
likeit_default_char_map( int c )
{
        return (int) LikeitDefaultCharMap[c];
}
```

```
Jan  7 17:10 1997  fsm.c Page 1 include <stdio.h>
include <stdlib.h>
#include <string.h>
#include <ctype.h>
#include <assert.h>
#include "common.h"
#include "array.h"
#include "fsm.h"

#define ASCII_8BIT              256
define ASCII_7BIT              128 enum fsm_memory_usage {
        FSM_MEM_FSM=0,
        FSM_MEM_STRING,
        FSM_MEM_USRMAP,
        FSM_MEM_CHRMAP,
        FSM_MEM_STATES,
        FSM_MEM_GLEN,
        FSM_MEM_GSTR,
        FSM_MEM_GSUBST,
        FSM_MEM_C2E,
        FSM_MEM_E2S,
        FSM_MEM_OVERHEAD,
        FSM_MEM_TOTAL,          /* Must be last */
        FSM_NUM_MEM
};

static void     print_memory_usage( FSM *fsm );
#if 0
static void     print_states( FSM *fsm );
#endif
static void     get_memory_usage( FSM *fsm, int mem[] );
static USHORT   maximal_suffix( USHORT **rstree, UCHAR *rbuf );

FSM *
fsm_create( UCHAR *string, int gmax, int (*umap)(int) )
{
        int     i, j, c, cu, txc, st, slen, space, nextfree, infolen;
        int     nbasis, curstate, nstates_max, nstates;
        int     statex, ne, nedges;
        UCHAR   *usrmap, *chrmap;
        UCHAR   tmpmap[ASCII_8BIT], invmap[ASCII_8BIT];
        UCHAR   *p, *g;
        UCHAR   *gstr, *gstrp, *glen, *glenp, *c2e, *c2ep;
        USHORT  *states, *gsubst, *gsubp, *e2s, *e2sp;
        USHORT  *rsp, **rstree, *gst;
        FSM     *fsm;
```

Jan  7 17:10 1997   fsm.c Page 2

```
        space = mem_total_space();

/* STEP 1: Determine basis set, and the mapping to a new compact
      character set.
    */ usrmap = mem_alloc(ASCII_8BIT*sizeof(UCHAR));
        chrmap = mem_alloc(ASCII_8BIT*sizeof(UCHAR));

memset(usrmap, 0, ASCII_8BIT);
        memset(tmpmap, 0, ASCII_8BIT);
        memset(invmap, 0, ASCII_8BIT);
        memset(chrmap, 0, ASCII_8BIT);

/* Build user char map by calling his function *
        for (cu=0 ; cu < ASCII_8BIT ; cu++) {
                usrmap[cu] = (UCHAR)(*umap)(cu);
        }

/* Loop over string, building basis set */
        nbasis = 0;
        for (i=0 ; (cu = string[i]) ; i++) {
                c = usrmap[cu];

/* Assign a compact character code (beginning
                                   with 1) to each unique usrmap range value
                                   occurring in the string.
                                 */
                if (!tmpmap[c]) {
                        txc = ++nbasis;

/* tmpmap[] contains a mapping from umap-
                                   transformed characters to compact set.
                                 */
                        tmpmap[c]  = txc;
                        invmap[txc] = c;   /* Use usrmap range val for inv map *
                }
        }
        slen = i;               /* Record the length of the string */

/* Build final character mapping table, which
                                   combines the umap mapping and the compact
                                   character set mapping:  Loop over all
                                   possible 8-bit user characters.
                                 */
        for (cu=0 ; cu < ASCII_8BIT ; cu++) {
                c = usrmap[cu];
```

Jan 7 17:10 1997 fsm.c Page 3

```c
                if (tmpmap[c]) {
                        chrmap[cu] = tmpmap[c];
                }
        }

/* STEP 2: Process translated basis string IN REVERSE, building a
   reverse search tree of polygraphs.  This will be freed later.
   The states and state numbers in this tree correspond to states
   of the automaton to be built.
 */
                                /* Num of states cannot exceed the length
                                   of the basis string times the range of
                                   polygraphs (+1 is for the null state).
                                 */
        nstates_max = slen*gmax + 1;

/* The temp tree element consists of nbasis
                                   short ints, indexed from 1 to nbasis.
                                 */
        rstree = array_create1(sizeof(USHORT), 0, 2, nstates_max, nbasis+1);

/* Allocate max-size state and info vectors */
        states = mem_alloc(nstates_max *     3 * sizeof(USHORT));
        gsubst = mem_alloc(nstates_max * gmax * sizeof(USHORT));
        gstr   = mem_alloc(nstates_max * gmax * sizeof(UCHAR));
        glen   = mem_alloc(nstates_max        * sizeof(UCHAR));

gst    = mem_alloc(gmax*sizeof(USHORT));          /* Temporary */ gsubp = gsubst;
        gstrp = gstr;
        glenp = glen;

/* Assign state 0 as the null state (""),
                                   and states 1-nbasis as the unigram
                                   states.  We will take advantage of the
                                   fact that unigram state numbers are equal
                                   to the (compact) character code of the
                                   single unigram character.
                                 */

/* Null state */
        memset(rstree[0], 0, (nbasis+1)*sizeof(USHORT));

states[0] = gstrp - gstr;
        *glenp++ = (UCHAR) 0;

/* Unigram states */
        for (txc=1 ; txc <= nbasis ; txc++) {
```

```
Jan  7 17:10 1997  fsm.c  Page 4 st = txc;

rstree[0][txc] = st;
                memset(rstree[st], 0, (nbasis+1)*sizeof(USHORT));

states[st*3] = gstrp - gstr;

*gstrp++ = invmap[txc];
                *gsubp++ = (USHORT) st;
                *glenp++ = (UCHAR)  1;
        } nextfree = nbasis+1;   /* Next free state number/tree node */ for (p=string+slen-1 ; p >= string ; p--) {
                                /* Start at root for each new char pos */
                rsp = rstree[0];

/* Look up to maxgram characters back */
                for (i=0 ; i < gmax && p-i >= string ; i++) {
                        cu  = (int) p[-i];
                        txc = (int) chrmap[cu];

if ((st = rsp[txc])) {
                                gst[i] = st;
                                rsp = rstree[st];

} else {                /* New state */
                                st = nextfree++;
                                assert(st < nstates_max);

gst[i] = st;

states[st*3] = gstrp - gstr;
                                for (j=i ; j >= 0 ; j--) {
                                        *gstrp++ = usrmap[p[-j]];
                                        *gsubp++ = gst[i-j];
                                }
                                *glenp++ = (UCHAR)(i+1);

/* Establish new tree link */
                                rsp[txc] = st;
                                rsp = rstree[st];
                                memset(rsp, 0, (nbasis+1)*sizeof(USHORT));
                        }
                }
        } nstates = nextfree;
```

```
Jan  7 17:10 1997  fsm.c  Page 5 infolen = gstrp - gstr;

states  = mem_realloc(states, nstates * 3 * sizeof(USHORT));
        gsubst  = mem_realloc(gsubst, infolen    * sizeof(USHORT));
        glen    = mem_realloc(glen,   nstates    * sizeof(UCHAR));
        gstr    = mem_realloc(gstr,   infolen    * sizeof(UCHAR));

mem_free(gst);

#ifdef  PRINT_REVERSE_SEARCH_TREE
        {
                int     i, j;
                UCHAR   *g;

g = mem_alloc((gmax+1)*sizeof(UCHAR));

printf("Reverse search tree:\n");

for (i=0 ; i < nstates ; i++) {
                        memcpy(g, gstr + states[i*3], glen[i]);
                        g[glen[i]] = 0;

printf("State %3d (%6s):", i, (char *)g);

for (j=1 ; j <= nbasis ; j++) {
                                if (rstree[i][j]) {
                                        printf(" %c:%3d", (char)invtx[j],
                                                          rstree[i][j]);
                                } else {
                                        printf("        ");
                                }
                        }
                        printf("\n");
                } mem_free(g);
        }
#endif  /* PRINT_REVERSE_SEARCH_TREE */

/* STEP 3:  For each state, determine edges of automaton graph using
       the reverse-search tree.
     */
                            /* +1 takes care of 1-based indexing */
        c2e  = mem_alloc((nstates*nbasis+1)*sizeof(UCHAR));   /* Exact size */
        e2s  = mem_alloc((nstates*nbasis+1)*sizeof(USHORT));  /* Maximal size */
        c2ep = c2e;
        e2sp = e2s;

g = mem_alloc((gmax+1)*sizeof(UCHAR));   /* Temporary */
```

```
Jan  7 17:10 1997  fsm.c Page 6 nedges = 0;

for (curstate=0 ; curstate < nstates ; curstate++) { statex = curstate*3;

/* Record in states[] the beginning positions
                               in c2e[] and e2s[] for the current state.
                             */
                states[statex + 1] = c2ep - c2e;
                states[statex + 2] = e2sp - e2s;

ne = 0;     /* Count explicit edges leaving this state */

/* Transition out of curstate on observation
                               of character txc:  Find state representing
                               maximal-length suffix of the current state,
                               plus the new character.
                             */
                gstrp = gstr + states[statex] + glen[curstate] - 1;
                for (i=0 ; i < MIN(glen[curstate], gmax-1) ; i++) {
                        g[i+1] = chrmap[gstrp[-i]];
                }
                g[i+1] = 0;

for (txc=1 ; txc <= nbasis ; txc++) {
                        g[0] = txc;

st = maximal_suffix(rstree, g);
                        if (st <= nbasis) {
                                c2ep[txc] = 0;
                        } else {
                                ne++;
                                c2ep[txc] = ne;
                                e2sp[ne]  = st;
                        }
                } c2ep += nbasis;
                e2sp += ne;

nedges += ne;
        } e2s = mem_realloc(e2s, (nedges+1)*sizeof(USHORT));

mem_free(g);
        array_destroy(rstree);
```

Jan  7 17:10 1997  fsm.c Page 7

```c
    /* STEP 4: Create FSM structure */ fsm = mem_alloc(sizeof(FSM));

fsm->string  = mem_alloc((slen+1)*sizeof(UCHAR));
        memcpy(fsm->string, string, slen+1);
        fsm->slen    = slen;
        fsm->gmax    = gmax;
        fsm->nbasis  = nbasis;
        fsm->nstates = nstates;
        fsm->nedges  = nedges;
        fsm->infolen = infolen;
        fsm->totmem  = mem_total_space() - space;

fsm->usrmap = usrmap;
        fsm->chrmap = chrmap;
        fsm->states = states;
        fsm->glen   = glen;
        fsm->gsubst = gsubst;
        fsm->gstr   = gstr;
        fsm->c2e    = c2e;
        fsm->e2s    = e2s;

return fsm;
} void
fsm_destroy( FSM *fsm )
{
        if (!fsm) {
                return;
        } mem_free(fsm->string);
        mem_free(fsm->usrmap);
        mem_free(fsm->chrmap);
        mem_free(fsm->states);
        mem_free(fsm->glen);
        mem_free(fsm->gsubst);
        mem_free(fsm->gstr);
        mem_free(fsm->c2e);
        mem_free(fsm->e2s);
        mem_free(fsm);
} void
fsm_print( FSM *fsm )
{
        int     i;
```

```c
            printf("Basis string: `%s'\n", (char *)fsm->string);
            printf("Max order polygraph: %d\n", fsm->gmax);
            printf("Basis set %d characters\n", fsm->nbasis);
            printf("Characters mapping into basis set: ");
            for (i=0 ; i < ASCII_8BIT ; i++) {
                    if (isprint(i) && fsm_translate_char(fsm,i)) {
                            fputc(i, stdout);
                    }
            }
            fputc('\n', stdout);
            printf("Number of states: %d\n", fsm->nstates);
            printf("Number of explicitly encoded transitions: %d\n", fsm->nedges);
            printf("\n");

printf("Memory usage:\n");
            print_memory_usage(fsm);
            printf("\n");

#if 0
            print_states(fsm);
#endif
}

/* Return the state number of the null state (i.e., the state corresponding
   to polygraph "".
 */
int
fsm_init( FSM *fsm )
{
            return 0;
}

/* Effect transition from the given state on observed character c.  The
   number of the new state is returned.
 */
int
fsm_transition( FSM *fsm, int state, UCHAR c )
{
            int     txc, edgenum;
            UCHAR   *c2ep;
            USHORT  *stp, *e2sp;

/* Translate observed char */
            txc = fsm_translate_char(fsm, c);

/* If char does not occur in basis string,
                                       transition to null state.
                                     */
            if (!txc) {
```

```
Jan  7 17:10 1997  fsm.c Page 9 return 0;
                }

/* Find state in states[] vector */
                stp = fsm->states + state*3;

/* Find state in c2e[] byte vector */
                c2ep = fsm->c2e + stp[1];

/* Zero c2e[] value =>
                                   transition to unigram state
                                 */
                if (!(edgenum = c2ep[txc])) {
                        return txc;

/* Find state in e2s[] vector */
                } else {
                        e2sp = fsm->e2s + stp[2];

/* Transition to new state */
                        return e2sp[edgenum];
                }
        }

/* Return the polygraph associated with a state.  "buf" is returned.
   The length of the polygraph may be queried using fsm_polygraph_len().
 */
UCHAR *
fsm_polygraph( FSM *fsm, int state, UCHAR *buf )
{
        int     glen;

glen = (int) fsm->glen[state];
        memcpy(buf, fsm->gstr + fsm->states[state*3], glen);
        buf[glen] = 0;

return buf;
} ifdef  NDEBUG
undef  NDEBUG
#define NDEBUG_UNDEFINED
#include <assert.h>
#endif  /* NDEBUG */

/* Exhaustively verify the integrity of a finite state machine. */ void
fsm_verify( FSM *fsm )
{
```

```
Jan  7 17:10 1997   fsm.c Page 10 int     i, c, cu, txc, nbasis, st, nst, len, plen, cnt;
        int     mem[FSM_NUM_MEM], ver[ASCII_8BIT];
        UCHAR   *tmpstr, *gstrp, *p, *g1, *g2, *c2ep;
        USHORT  *stp, *gsubp, *e2sp;

/* Verify array sizes */ get_memory_usage(fsm, mem);
        assert(mem[FSM_MEM_TOTAL] == fsm->totmem);      /* Verify */

/* Verify basis set */ memset(ver, 0, ASCII_8BIT*sizeof(int));

nbasis = 0;
        for (cu=0 ; cu < ASCII_8BIT ; cu++) {
                if ((txc = fsm_translate_char(fsm,cu))) {
                        ver[txc]++;
                        if (txc > nbasis) {
                                nbasis = txc;
                        }
                }
        }
        for (txc=1 ; txc <= nbasis ; txc++) {
                assert(ver[txc]);
        }
        assert(nbasis == fsm->nbasis);

/* Bounds check all pointers in the automaton */ for (st=0 ; st < fsm->nstates ; st++) { stp = fsm->states + st*3;
                assert(mem_address_is_valid(fsm->states, stp));
                assert(mem_address_is_valid(fsm->states, stp+2));

assert(mem_address_is_valid(fsm->glen, fsm->glen + st));

gstrp = fsm->gstr + stp[0];
                for (i=0 ; i < fsm->glen[st] ; i++) {
                        assert(mem_address_is_valid(fsm->gstr, gstrp + i));
                } gsubp = fsm->gsubst + stp[0];
                for (i=0 ; i < fsm->glen[st] ; i++) {
                        assert(mem_address_is_valid(fsm->gsubst, gsubp + i));
                } c2ep = fsm->c2e + stp[1];
```

```
Jan  7 17:10 1997  fsm.c Page 11 assert(mem_address_is_valid(fsm->c2e, c2ep));
                        assert(mem_address_is_valid(fsm->c2e, c2ep+nbasis));

e2sp = fsm->e2s + stp[2];
                        assert(mem_address_is_valid(fsm->e2s, e2sp));
                        for (i=1 ; i <= nbasis ; i++) {
                                assert(mem_address_is_valid(fsm->e2s, e2sp + c2ep[i]));
                        }
                }

/* Verify states */ g1 = mem_alloc((fsm->gmax+2)*sizeof(UCHAR));
                g2 = mem_alloc((fsm->gmax+2)*sizeof(UCHAR));

/* Temporary umap-coverted version of string */
                tmpstr = mem_alloc((fsm->slen+1)*sizeof(UCHAR));
                for (i=0 ; (cu = fsm->string[i]) ; i++) {
                        tmpstr[i] = fsm->usrmap[cu];
                }
                tmpstr[i] = 0;

/* Find every polygraph in string... */
                for (p=tmpstr ; *p ; p++) {
                        for (len=1 ; p[len-1] && len <= fsm->gmax ; len++) {
                                memcpy(g1, p, len);
                                g1[len] = 0;

/* ...and verify it has exactly one state */
                                cnt = 0;
                                for (st=0 ; st < fsm->nstates ; st++) {
                                        if (fsm_polygraph_len(fsm, st) == len) {
                                                fsm_polygraph(fsm, st, g2);
                                                if (!memcmp(g1, g2, len)) {
                                                        cnt++;
                                                }
                                        }
                                }
                                assert(cnt == 1);
                        }
                }

/* Verify every state's polygraph is in string *
                for (st=0 ; st < fsm->nstates ; st++) {
                        fsm_polygraph(fsm, st, g1);
                        assert(ustrstr(tmpstr, g1));

len = fsm_polygraph_len(fsm, st);
                        assert(len == ustrlen(g1));
```

```
Jan  7 17:10 1997  fsm.c Page 12 gsubp = fsm_substates(fsm, st);
                        for (i=1 ; i <= len ; i++) {
                                fsm_polygraph(fsm, (int)gsubp[i-1], g2);
                                assert(i == ustrlen(g2));
                                assert(fsm_polygraph_len(fsm, (int)gsubp[i-1]) == i);
                                assert(!memcmp(g1+len-i, g2, i));
                        }
                }

/* Verify transitions */ for (st=0 ; st < fsm->nstates ; st++) { fsm_polygraph(fsm, st, g1);
                        len = fsm_polygraph_len(fsm, st);
                        assert(len <= fsm->gmax);

/* Loop over all chars that might be observed */
                        for (c=1 ; c < ASCII_8BIT ; c++) {
                                g1[len]   = fsm->usrmap[c];  /* Append observed char */
                                g1[len+1] = 0;

/* Find maximal-length suffix in string */
                                p = (len+1 <= fsm->gmax) ? g1 : g1 + 1;
                                while (*p) {
                                        if (ustrstr(tmpstr, p)) {
                                                break;
                                        }
                                        p++;
                                }
                                plen = ustrlen(p);

/* Make sure transition takes us to that state *
                                nst = fsm_transition(fsm, st, (UCHAR)c);
                                fsm_polygraph(fsm, nst, g2);
                                assert(!memcmp(p, g2, plen));
                        }
                } mem_free(g1);
                mem_free(g2);
                mem_free(tmpstr);
} ifdef  NDEBUG_UNDEFINED
undef  NDEBUG_UNDEFINED
#define NDEBUG
#include <assert.h>
endif  /* NDEBUG_UNDEFINED */
```

```
Jan  7 17:10 1997  fsm.c Page 13 static void
print_memory_usage( FSM *fsm )
{
        int     i, mem[FSM_NUM_MEM];

get_memory_usage(fsm, mem);

for (i=0 ; i < FSM_NUM_MEM ; i++) {
                printf(" %5d", mem[i]);
        }
        printf("\n");
} if 0 static void
print_states( FSM *fsm )
{
        int     cu, st, txc, dst;
        UCHAR   *g, *c2ep;
        USHORT  *e2sp;

g = mem_alloc((fsm->gmax+1)*sizeof(UCHAR));

for (st=0 ; st < fsm->nstates ; st++) {
                fsm_polygraph(fsm, st, g);
                printf("State %3d (%6s):   c2ex %d, e2sx %d\n",
                        st,
                        (char *)g,
                        (int) fsm->states[st*3 + 1],
                        (int) fsm->states[st*3 + 2]);

c2ep = fsm->c2e + fsm->states[st*3 + 1];
                e2sp = fsm->e2s + fsm->states[st*3 + 2];

for (cu=0 ; cu < ASCII_8BIT ; cu++) {
                        if (!(txc = fsm_translate_char(cu))) {
                                continue;
                        }
                        printf("\t");
                        printf("c2e(`%c')=%3d, ", (char)cu, c2ep[txc]);
                        dst = c2ep[txc] ? e2sp[c2ep[txc]] : txc;
                        fsm_polygraph(fsm, dst, (char *)g);
                        printf("dst=%3d (%6s)\n", dst, (char *)g);
                }
        }
        printf("\n");
```

```c
        mem_free(g);
} endif static void
get_memory_usage( FSM *fsm, int mem[] )
{
        int     i;

mem[FSM_MEM_FSM]       = sizeof(FSM);
        mem[FSM_MEM_STRING]    = fsm->slen+1;
        mem[FSM_MEM_USRMAP]    = ASCII_8BIT;
        mem[FSM_MEM_CHRMAP]    = ASCII_8BIT;
        mem[FSM_MEM_STATES]    = fsm->nstates * 3 * sizeof(USHORT);
        mem[FSM_MEM_GLEN]      = fsm->nstates     * sizeof(UCHAR);
        mem[FSM_MEM_GSTR]      = fsm->infolen     * sizeof(UCHAR);
        mem[FSM_MEM_GSUBST]    = fsm->infolen     * sizeof(USHORT);
        mem[FSM_MEM_C2E]       = (fsm->nstates*fsm->nbasis +1) * sizeof(UCHAR);
        mem[FSM_MEM_E2S]       = (fsm->nedges +1) * sizeof(USHORT);
        mem[FSM_MEM_OVERHEAD]  = 10 * sizeof(memory_t);
        mem[FSM_MEM_TOTAL]     = 0;
        for (i=0 ; i < FSM_MEM_TOTAL ; i++) {
                mem[FSM_MEM_TOTAL] += mem[i];
        }
}

/* Find state representing the maximal-length suffix of the polygraph
   in rbuf (assumed to be stored in reverse order).
 */ static USHORT
maximal_suffix( USHORT **rstree, UCHAR *rbuf )
{
        USHORT  state, next, *rsp;

state = 0;
        rsp = rstree[state];

for (; *rbuf ; rbuf++) {
                if (!(next = rsp[(int)*rbuf])) {
                        break;
                }
                rsp = rstree[(state = next)];
        } return state;
}
```

Jan 10 10:50 1997  polycount.c Page 1

```c
#include <stdio.h>
include <stdlib.h>
#include <ctype.h>
#include <string.h>
#include <assert.h>
#include "common.h"
#include "likeit_sys.h"

/* The filter that matches based on polygraph counts.  This is thought of as
   an extreme case of bipartite matching, where the cost of an edge between
   two matching polygraphs is 0.5 times the length of the string (padded out),
   and the cost of each *pair* of unmatched polygraphs is 1.0 times the
   length of the string.

This reduces to a simple polygraph count.  We build an array of counts
   for the query first.  Then for each database record, we build an array
   of counts, and compare them to the query polygraph counts.  For each
   polygraph that occurs in both strings, the MIN() of the two counts gives
   the number of edges.  All polygraphs not part of an edge are unmatched.
   Costs are weighted by the polygraph.

This yields a suprisingly powerful yet very fast filter.
 */ void
likeit_filter_PolyCount( UCHAR *query, int (*charmap)(int), RECFUNC recfunc,
                        int maxreclen, int gmin, int gmax,
                        HEAP *inheap, HEAP *outheap )
{
        register int    g, glen, state, *rcntp, *rrecp, *ecntp;
        register USHORT sst;

int     rhandle, recnum, padlen, totedges_w, totusyms_w;
        int     suboff, nstates, *maxusyms;
        int     *qcounts, *rcounts, *rcntrec, *edgecounts;
        UCHAR   *glens, *record, *p;
        USHORT  *subst;
        HEAPKEY edgecost, usymcost, totcost;
        FSM     *fsm;

padlen   = maxreclen;
        edgecost = 0.5*padlen;
        usymcost = 0.5*padlen;  /* 1.0*padlen per unmatched "edge" */

/* CREATE QUERY AUTOMATON */ fsm = fsm_create(query, gmax, charmap);
/* fsm_verify(fsm); */
        nstates = fsm_num_states(fsm);
```

```
Jan 10 10:50 1997  polycount.c Page 2

/* Allocate temporary arrays */
        qcounts = mem_alloc( nstates * sizeof(int));
        rcounts = mem_alloc( nstates * sizeof(int));
        rcntrec = mem_alloc( nstates * sizeof(int));

glens = fsm_polygraph_lens(fsm);

/* Count of edges for each polygraph length */
        edgecounts = mem_alloc((gmax+1) * sizeof(int));
        maxusyms   = mem_alloc((gmax+1) * sizeof(int));
        for (glen=gmin ; glen <= gmax ; glen++) {
                maxusyms[glen] = 2*(padlen - (glen-1));
        } suboff = gmin - 1;

/* COUNT POLYGRAPHS IN QUERY */

/* ...by tracing query's own state sequence. */
        memset(qcounts, 0, nstates*sizeof(int));

state = fsm_init(fsm);
        for (p=query ; *p ; p++) {
                state = fsm_transition(fsm, state, *p);
                glen  = glens[state];

subst = fsm_substates(fsm, state) + suboff;
                for (g=gmin ; g <= glen ; g++, subst++) {
                        qcounts[*subst]++;
                }
        }

/* PROCESS DATABASE RECORDS */ memset(rcounts, 0, nstates*sizeof(int));
        for (state=0 ; state < nstates ; state++) {
                rcntrec[state] = -1;
        } rhandle = likeit_init_records(recfunc, inheap);

while ((rhandle = likeit_next_record(rhandle, recfunc, inheap, &record,
                                             &recnum)) != -1) { for (glen=gmin ; glen <= gmax ; glen++) {
                        edgecounts[glen] = 0;
                }
```

Jan 10 10:50 1997 polycount.c Page 3

```c
                        /* Trace the state sequence, and build counts,
                            keeping a list of them for speed later.
                         */
        state = fsm_init(fsm);

for (p=record ; *p ; p++) {
                state = fsm_transition(fsm, state, *p);
                glen  = glens[state];

/* Increment count for this state and each
                            substate (suffix) of this state.
                         */
                subst = fsm_substates(fsm, state)+suboff;
                ecntp = edgecounts+gmin;
                for (g=gmin ; g <= glen ; g++, ecntp++) {

/* Assign variables to substate, ptr to
                                    substate count, and substate count
                                    record number, and polygraph length.
                                 */
                        sst   = *subst++;
                        rcntp = rcounts + sst;
                        rrecp = rcntrec + sst;

/* If record number for count does
                                    not match ours, then this is the
                                    first occurrence of the state.  If
                                    it matches, increment the count.
                                 */
                        if (*rrecp == recnum) {
                                (*rcntp)++;
                        } else {
                                *rrecp = recnum;
                                *rcntp = 1;
                        }

/* If the count for this state has not
                                    yet reached the high-water mark of
                                    the query count for the state, then
                                    count an edge.
                                 */
                        if (*rcntp <= qcounts[sst]) {
                                (*ecntp)++;
                        }
                }
        }
                        /* Calculate total edges and unmatched symbols *
        totedges_w = 0;   /* _w means weight multiplier is included */
        totusyms_w = 0;   /* _w means weight multiplier is included */
```

```
Jan 10 10:50 1997  polycount.c Page 4 for (glen=gmin ; glen <= gmax ; glen++) {
                        totedges_w += glen*edgecounts[glen];
                        totusyms_w += glen*(maxusyms[glen] - 2*edgecounts[glen])
                }

/* Calculate matching cost */
                totcost = (totedges_w * edgecost) + (totusyms_w * usymcost);

(void) likeit_add_to_heap(outheap, totcost, (HEAPID) recnum);
        } fsm_destroy(fsm);

mem_free(qcounts);
        mem_free(rcounts);
        mem_free(rcntrec);
        mem_free(edgecounts);
        mem_free(maxusyms);
}
```

```
Jun 18 12:12 1997   qconvex.c Page 1 include <stdio.h>
include <stdlib.h>
#include <ctype.h>
#include <string.h>
#include <assert.h>
#include "common.h"
#include "likeit_sys.h"

/* The bipartite tour constituted by the occurrences of a given polygraph in
   query and database record can be partitioned by a simple algorithm into
   "levels": subtours in which the nodes alternate in color (query occurrences
   being one "color", record occurrences a second "color").  The derived data
   type for such a subtour is called LTOUR.

The levels are numbered with integers that form a compact sequence about
   the value 0.  We do not know in advance what the sequence of level
   numbers will be for a given polygraph.  Only the levels for polygraphs
   that occur in both query and record are of interest, and the total number
   of levels of interest for all polygraphs in query and record is bounded
   by the number of polygraphs in a maximum-length record, which is easy to
   calculate.  So at the start, we create space for that many LTOURs.  As
   levels are created, LTOUR structures are allocated for them, pointers to
   the structures being chained in a doubly-linked list for each polygraph.

Within an LTOUR, nodes are matched greedily.  We don't know in advance
   whether the subtour length will be odd or even, so the costs of two possible
   greedy matchings must be calculated: (1) the matching 1-2, 3-4, etc. (with
   the final node in the LTOUR remaining unmatched in the case of an odd-length
   LTOUR), and (2) the matching 2-3, 4-5, etc. (with node 1 remaining unmatched
   in the case of an odd-length LTOUR).  In the case of an even-length LTOUR,
   we obviously must use matching (1).  In the case of an odd-length LTOUR, we
   choose the best (lowest-cost) of the two matchings.
*/
typedef struct level_tour_strct {
        int     state;          /* Polygraph ID */
        int     level;          /* Level number */
        int     lplus1;         /* Ptr to LTOUR for level+1 for this polygraph */
        int     lminus1;        /* Ptr to LTOUR for level-1 for this polygraph */ int     startcolor;     /* Color of first node in subtour */
        int     tourlen;        /* Subtour length, so far */
        int     lastpos;        /* Coordinate of immediately previous node */
        int     disp12;         /* Cost of greedy matching 1-2, 3-4, ... */
        int     disp23;         /* Cost of greedy matching 2-3, 4-5. ... */
        int     signeddisp;     /* Result of decision btw disp12 and disp23 */
} LTOUR;

#define LTOUR_NULL      (-1)

typedef struct tour_strct {
```

Jun 18 12:12 1997   qconvex.c  Page 2

```c
        int     nstates;        /* Number of unique polygraphs in query */ int     gmin;           /* Min polygraph length */
        int     gmax;           /* Max polygraph length */

/* Arrays indexed by polygraph (state) number */
        int     *grecs;         /* Have-we-seen-it-this-record? array */
        int     *curlevels;     /* Ptr to LTOUR for current level value */
        int     *dvals;         /* Current value of d( ) function */ int     *glist;         /* Polygraphs seen in both query and record */

/* Arrays indexed by polygraph length */
        int     *mcounts;       /* Accumulators for matched symbols */
        int     *ucounts;       /* Accumulators for unmatched symbols */
        int     *maxusyms;      /* Unmatched symbol ceilings, based on padded-
                                   out record lengths.
                                 */
        double  usymcost;       /* Unmatched symbol cost */

/* Output values */
        double  avgdisp;        /* (Signed) average displacement */
        double  totalcost;      /* Total matching cost */

/* Level tours */
        int     maxltours;      /* Number of LTOURs mem-alloc'd */
        int     numltours;      /* Number of LTOURs in use */

LTOUR   *ltours;        /* Pool of LTOURs */
} TOUR;

#define ROUND_TO_INT(f)  ((f) >= 0.0 ? (int)ceil((double)(f)) : \
                          (int)floor((double)(f)))

#define QUICK_ALIGN     TRUE
#define NO_QUICK_ALIGN  FALSE
define MAX_REALIGN     3 define POLYGRAPHS_IN_STRING(slen,glen)  ((slen) - ((glen)-1))

define QCOLOR  -1
#define RCOLOR   1
#define OPPOSITE_COLOR(color)   (-(color))
#define IS_ODD(n)               ((n) & 1)

static void     qconvex( FSM *fsm, UCHAR *record, int recnum, TOUR *tour,
                         INVTAB *invtab, int align, BOOL quick_align );
static TOUR *   tour_create( int gmin, int gmax, int nstates, int qlen,
```

Jun 18 12:12 1997  qconvex.c  Page 3

```c
                                int maxreclen );
static void     tour_destroy( TOUR *tour );
static void     tour_init_records( TOUR *tour );
static void     tour_clear_polygraphs( TOUR *tour );
static void     tour_init_polygraph( TOUR *tour, int state );
static void     tour_add_occurrence( TOUR *tour, int state, int pos, int color )
static int      tour_get_ltour( TOUR *tour, int state, int level );
static int      tour_new_ltour( TOUR *tour, int state, int level );
static void     updateltour( LTOUR *ltp, int pos, int color );
static void     tour_cost( TOUR *tour, FSM *fsm, BOOL quick_align );

void
likeit_filter_QConvex_1( UCHAR *query, int (*charmap)(int), RECFUNC recfunc,
                        int maxreclen, int gmin, int gmax,
                        HEAP *inheap, HEAP *outheap )
{
        int     qlen, rhandle, recnum, nstates;
        UCHAR   *record;
        FSM     *fsm;
        INVTAB  *invtab;
        TOUR    *tour;

qlen = ustrlen(query);

/* CREATE QUERY AUTOMATON */ fsm = fsm_create(query, gmax, charmap);
/* fsm_verify(fsm); */
        nstates = fsm_num_states(fsm);

/* CREATE INVERTED TABLE OF POLYGRAPHS IN QUERY */ invtab = invtab_create(query, qlen, gmin, gmax, fsm);

/* CREATE TOUR STRUCTURES */ tour = tour_create(gmin, gmax, nstates, qlen, maxreclen);

/* PROCESS DATABASE RECORDS */ tour_init_records(tour);
        rhandle = likeit_init_records(recfunc, inheap);

while ((rhandle = likeit_next_record(rhandle, recfunc, inheap, &record,
                                        &recnum)) != -1) {
/* printf("=================== RECORD %d ====================\n", recnum); */
/* printf("`%s'\n", record); */
```

Jun 18 12:12 1997   qconvex.c  Page 4

```
                qconvex(fsm, record, recnum, tour, invtab, 0, QUICK_ALIGN);

(void) likeit_add_to_heap(outheap, (HEAPKEY)tour->totalcost,
                                          (HEAPID) recnum);
        } invtab_destroy(invtab);
        tour_destroy(tour);
        fsm_destroy(fsm);
}
void
likeit_filter_QConvex_2( UCHAR *query, int (*charmap)(int), RECFUNC recfunc,
                      int maxreclen, int gmin, int gmax,
                      HEAP *inheap, HEAP *outheap )
{
        int     qlen, rhandle, recnum, nstates, delta, align, nrealign;
        UCHAR   *record;
        double  oldcost;
        FSM     *fsm;
        INVTAB  *invtab;
        TOUR    *tour;

qlen = ustrlen(query);

/* CREATE QUERY AUTOMATON */ fsm = fsm_create(query, gmax, charmap);
/* fsm_verify(fsm); */
        nstates = fsm_num_states(fsm);

/* CREATE INVERTED TABLE OF POLYGRAPHS IN QUERY */ invtab = invtab_create(query, qlen, gmin, gmax, fsm);

/* CREATE TOUR STRUCTURES */ tour = tour_create(gmin, gmax, nstates, qlen, maxreclen);

/* PROCESS DATABASE RECORDS */ rhandle = likeit_init_records(recfunc, inheap);

while ((rhandle = likeit_next_record(rhandle, recfunc, inheap, &record,
                                          &recnum)) != -1) {

/* printf("=================== RECORD %d ====================\n", recnum); */
/* printf("`%s'\n", record); */
```

```
Jun 18 12:12 1997   qconvex.c Page 5 align = 0;

tour_init_records(tour);
                qconvex(fsm, record, recnum, tour, invtab, align,NO_QUICK_ALIGN)

nrealign = 0;
                do {
                        oldcost = tour->totalcost;
                        nrealign++;

delta = ROUND_TO_INT(-tour->avgdisp);
                        if (!delta) {
                                break;
                        }
                        align += delta;
/* printf("align=%d\n", align); */ tour_init_records(tour);
                        qconvex(fsm, record, recnum, tour, invtab, align,
                                NO_QUICK_ALIGN);

} while (nrealign < MAX_REALIGN && tour->totalcost < oldcost);

/* printf("realignments=%d\n", nrealign); */

(void) likeit_add_to_heap(outheap, (HEAPKEY) tour->totalcost,
                                          (HEAPID) recnum);
        } invtab_destroy(invtab);
        tour_destroy(tour);
        fsm_destroy(fsm);
} static void
qconvex( FSM *fsm, UCHAR *record, int recnum, TOUR *tour, INVTAB *invtab,
        int align, BOOL quick_align )
{
        register int    g, glen, state;
        register USHORT sst;

int     gmin, qpos, rpos;
        int     suboff, nstates, glsize;
        int     *grecs, *grecp, *glist, *glp;
        UCHAR   *glens, *p;
        /* UCHAR        buf[10];*/
        USHORT  *subst;
```

```c
        nstates = fsm_num_states(fsm);
        gmin    = tour->gmin;
        suboff  = gmin - 1;       /* Where to start in a substates array */
        glens   = fsm_polygraph_lens(fsm);

tour_clear_polygraphs(tour);

grecs = tour->grecs;
        glist = tour->glist;
        glp   = glist;

/* Trace the state sequence for the record. */
        state = fsm_init(fsm);

/* The align parameter pertains to the record,
                                   which is shifted left or right relative to
                                   the query, depending on whether align is
                                   negative or positive, respectively.  A value
                                   of zero for align indicates left-alignment.
                                */
        for (rpos=align, p=record ; *p ; rpos++, p++) {

/* Transition to next state (polygraph) */
                state = fsm_transition(fsm, state, *p);

/* Get substates (suffixes) of polygraph */
                subst = fsm_substates(fsm,state) + suboff;

/* Loop over suffixes we care about */
                for (glen=gmin ; glen <= glens[state] ; glen++) {
                        sst   = *subst++;          /* Suffix state number */
                        grecp = grecs + sst;

/* First occurrence of polygraph in record? */
                        if (*grecp != recnum) {
                                *grecp = recnum;         /* Register rec num */
                                *glp++ = sst;            /* Add to seen-list */
/* printf("Opening tour for `%s'\n", fsm_polygraph(fsm, sst, buf)); */

/* Open query occurrence thread in invtab. */
                                invtab_gopen(invtab, sst);

/* Initialize subtours for this polygraph. */
                                tour_init_polygraph(tour, sst);
                        }

/* Process query occurrences up to current pos *
                        while ((qpos = invtab_gget(invtab,sst)) != -1) {
```

```c
                                        if (qpos > rpos) {
                                                invtab_gunget(invtab,sst);
                                                break;
                                        }
/* printf("Adding query occ of `%s' at coord %d\n", fsm_polygraph(fsm, sst, buf)
/*          qpos); */
                                        tour_add_occurrence(tour, sst, qpos, QCOLOR);
                                }

/* Process polygraph occurrence in record. */
                        tour_add_occurrence(tour, sst, rpos, RCOLOR);
/* printf("Adding record occ of `%s' at coord %d\n", */
/*                              fsm_polygraph(fsm, sst, buf), rpos); */
                        }
                }
                                /* We have processed all polygraphs in the
                                   record.  Now process the remaining
                                   occurrences of "interesting" polygraphs in
                                   the query (the ones in glist, whose invtab
                                   threads are open).
                                 */
        glsize = glp - glist;
        glp = glist;
        for (g=0 ; g < glsize ; g++) {
                state = *glp++;
                while ((qpos = invtab_gget(invtab, state)) != -1) {
                        tour_add_occurrence(tour, state, qpos, QCOLOR);
/* printf("Cleanup: Adding query occ of `%s' at coord %d\n", */
/*                              fsm_polygraph(fsm, state, buf), qpos); */
                }
        } tour_cost(tour, fsm, quick_align);
}
static TOUR *
tour_create( int gmin, int gmax, int nstates, int qlen, int maxreclen )
{
        int     glen, padlen, maxltours;
        TOUR    *tour;

tour = mem_alloc(sizeof(TOUR));

tour->avgdisp = 0;

tour->nstates = nstates;

tour->gmin = gmin;
```

```
Jun 18 12:12 1997   qconvex.c Page 8 tour->gmax = gmax;

/* Create have-we-seen-it-this-record? array
                                   for polygraphs. This is so that we can
                                   avoid the clearing of large arrays on a
                                   per-record basis. Once a polygraph is
                                   seen in a record, the record number is
                                   registered in this array.
                                */
        tour->grecs = mem_alloc(nstates * sizeof(int));

/* Simple list of polygraphs seen this record */
        tour->glist = mem_alloc(nstates * sizeof(int));

/* Create array for counting matched polygraphs
                                   and unmatched polygraphs for each polygraph
                                   length.
                                */
        tour->mcounts = mem_alloc((gmax+1) * sizeof(int));
        tour->ucounts = mem_alloc((gmax+1) * sizeof(int));

/* Padded-out string length takes into account
                                   most extreme alignment possible between
                                   query and a maximum-length record; e.g., +-------------- padlen -------------+
                                   qqqqqqqqq
                                             rrrrrrrrrrrrrrrrrrrrrrrrrrrr
                                */
        padlen = qlen + maxreclen;

/* Calculate maximum possible unmatched
                                   polygraphs per polygraph length, for
                                   padded-out extreme situation.
                                */
        tour->maxusyms = mem_alloc((gmax+1) * sizeof(int));
        for (glen=gmin ; glen <= gmax ; glen++) {
                tour->maxusyms[glen] = 2 * POLYGRAPHS_IN_STRING(padlen, glen);
        } tour->usymcost = 0.5 * padlen;          /* Unmatched symbol cost */
/* printf("usymcost=%.1f\n", tour->usymcost); */ tour->dvals    = mem_alloc(nstates*sizeof(int));
        tour->curlevels = mem_alloc(nstates*sizeof(int));

/* Calculate max number of polygraphs for each
                                   polygraph length, based on padded-out strings
                                   as long as the max database record length.
                                   The sum of these is an upper bound for the
```

```
Jun 18 12:12 1997   qconvex.c Page 9 number of LTOURs.
                                */
        maxltours = 0;
        for (glen=gmin ; glen <= gmax ; glen++) {
                maxltours += POLYGRAPHS_IN_STRING(maxreclen, glen);
        }

/* Now allocate LTOURs */
        tour->maxltours = maxltours;
        tour->numltours = 0;
        tour->ltours    = mem_alloc(maxltours*sizeof(LTOUR));

return tour;
} static void
tour_destroy( TOUR *tour )
{
        mem_free(tour->grecs);
        mem_free(tour->glist);
        mem_free(tour->mcounts);
        mem_free(tour->ucounts);
        mem_free(tour->maxusyms);
        mem_free(tour->dvals);
        mem_free(tour->curlevels);
        mem_free(tour->ltours);
        mem_free(tour);
}

/* Clear the record number registration array */ static void
tour_init_records( TOUR *tour )
{
        int     state;

for (state=0 ; state < tour->nstates ; state++) {
                tour->grecs[state] = -1;
        }
}

/* "Clear" a tour by deallocating all LTOURS. */ static void
tour_clear_polygraphs( TOUR *tour )
{
        tour->numltours = 0;
}

/* Initialize the tour with respect to a polygraph. */
```

```
Jun 18 12:12 1997   qconvex.c Page 10 static void
tour_init_polygraph( TOUR *tour, int state )
{
        tour->dvals[state]     = 0;
        tour->curlevels[state] = LTOUR_NULL;
}

/* Add an occurrence of a polygraph to the tour. */ static void
tour_add_occurrence( TOUR *tour, int state, int pos, int color )
{
        int     d, level, ltnum;
        LTOUR   *ltp;

/* STEP 1: Calculate level value for new occurrence of polygraph. */ d = tour->dvals[state];
        if (color == QCOLOR) {
                level = d;
                d--;
        } else {
                assert(color == RCOLOR);
                level = d + 1;
                d++;
        }
        tour->dvals[state] = d;
        /* printf("\tlevel=%d\n", level); */

/* STEP 2: Obtain index and ptr to the LTOUR for this polygraph/level,
       creating it if necessary.
     */
        ltnum = tour_get_ltour(tour, state, level);

tour->curlevels[state] = ltnum;              /* Update current LTOUR ptr */ ltp = tour->ltours + ltnum;
        assert(ltp->state == state);
        assert(ltp->level == level);

/* STEP 3: Update LTOUR. */ updateltour(ltp, pos, color);
}
/* Get LTOUR for the given polygraph/level, creating it if necessary. */
```

```
Jun 18 12:12 1997   qconvex.c Page 11 static int
tour_get_ltour( TOUR *tour, int state, int level )
{
        int     prevltnum, ltnum = 0;
        LTOUR   *prevltp, *ltp;

/* Get index of LTOUR for last occurrence
                                     (in query or record) of polygraph.
                                 */
        prevltnum = tour->curlevels[state];

/* No prev occ: alloc polygraph's first LTOUR. */
        if (prevltnum == LTOUR_NULL) {
                return tour_new_ltour(tour, state, level);
        } prevltp = tour->ltours + prevltnum;

/* Compare new level value to previous. */
        switch (level - prevltp->level) {
        case 0:                 /* Equal: same LTOUR */
                ltnum = prevltnum;
                break;
        case 1:                 /* New level is prev level plus 1 */
                ltnum = prevltp->lplus1;

/* If necessary, create new LTOUR and link
                                     into polygraph's LTOUR list.
                                 */
                if (ltnum == LTOUR_NULL) {
                        ltnum = tour_new_ltour(tour, state, level);
                        ltp   = tour->ltours + ltnum;

prevltp->lplus1 = ltnum;
                        ltp->lminus1    = prevltnum;
                }
                break;
        case -1:                /* New level is prev level minus 1 */
                ltnum = prevltp->lminus1;

/* If necessary, create new LTOUR and link
                                     into polygraph's LTOUR list.
                                 */
                if (ltnum == LTOUR_NULL) {
                        ltnum = tour_new_ltour(tour, state, level);
                        ltp   = tour->ltours + ltnum;

prevltp->lminus1 = ltnum;
                        ltp->lplus1      = prevltnum;
```

```
Jun 18 12:12 1997   qconvex.c Page 12

}
                        break;
                default:
                        FATAL("tour_add_occurrence", "level=%d, prev level=%d",
                                level, prevltp->level);
                } return ltnum;
        }

/* Allocate the LTOUR for a polygraph/level. */ static int
        tour_new_ltour( TOUR *tour, int state, int level )
        {
                int     ltnum;
                LTOUR   *ltp;

assert(tour->numltours < tour->maxltours);

ltnum = (tour->numltours)++;
                ltp   = tour->ltours + ltnum;

ltp->state   = state;
                ltp->level   = level;
                ltp->lplus1  = LTOUR_NULL;
                ltp->lminus1 = LTOUR_NULL;
                ltp->tourlen = 0;       /* Will indicate new LTOUR to caller */ return ltnum;
        }

/* Update the LTOUR for a polygraph/level with a new occurrence. */ static void
        updateltour( LTOUR *ltp, int pos, int color )
        {
                                       /* If LTOUR newly allocated, initialize it... */
                if (ltp->tourlen == 0) {
                        ltp->disp12     = 0;
                        ltp->disp23     = 0;

ltp->lastpos    = pos;
                        ltp->startcolor = color;

ltp->tourlen    = 1;

} else {                /* ... else update it. */
                        (ltp->tourlen)++;
```

```
                                        /* If subtour length is now odd, our color
                                           should be the same as startcolor, and we
                                           have a new edge in greedy matching 2-3,...
                                         */
                    if (IS_ODD(ltp->tourlen)) {
                            assert(color == ltp->startcolor);
                            ltp->disp23 += pos - ltp->lastpos;

/* If subtour length is now even, our color
                                           should be the opposite of startcolor, and we
                                           have a new edge in greedy matching 1-2,...
                                         */
                    } else {
                            assert(color == OPPOSITE_COLOR(ltp->startcolor));
                            ltp->disp12 += pos - ltp->lastpos;
                    } ltp->lastpos = pos;
            }
} static void
tour_cost( TOUR *tour, FSM *fsm, BOOL quick_align )
{
        int     ltnum, glen, weight, align;
        int     stcolor, sdisp;
        int     *mcounts, *ucounts;
        UCHAR   *glens;
        double  avgdisp_num, avgdisp_den, mcost, ucost;
        LTOUR   *ltp;
        /* UCHAR           buf[10];*/ glens = fsm_polygraph_lens(fsm);

mcounts = tour->mcounts;
        ucounts = tour->ucounts;
        memset(mcounts, 0, (tour->gmax+1) * sizeof(int));
        memset(ucounts, 0, (tour->gmax+1) * sizeof(int));

/* Loop over all subtours:  Determine displacement to use for
       calculating matching cost, and calculate avg displacement.
     */
        avgdisp_num = 0.0;
        avgdisp_den = 0.0;

ltp = tour->ltours;
        for (ltnum=0 ; ltnum < tour->numltours ; ltnum++, ltp++) {
```

Jun 18 12:12 1997   qconvex.c Page 14

```c
                if (ltp->tourlen < 2) { /* Skip over single-node subtours */
                        continue;
                } weight = glen = glens[ltp->state];

if (IS_ODD(ltp->tourlen)) {
                        if (ltp->disp12 <= ltp->disp23) {           /* disp12 */
                                stcolor = ltp->startcolor;
                                sdisp = (stcolor == QCOLOR) ?
                                        ltp->disp12 : -ltp->disp12;

} else {                                    /* disp23 */
                                stcolor = OPPOSITE_COLOR(ltp->startcolor);
                                sdisp = (stcolor == QCOLOR) ?
                                        ltp->disp23 : -ltp->disp23;
                        } mcounts[glen] += ltp->tourlen - 1;

} else {
                        stcolor = ltp->startcolor;                  /* disp12 */
                        sdisp = (stcolor == QCOLOR) ?
                                ltp->disp12 : -ltp->disp12;

mcounts[glen] += ltp->tourlen;
                } ltp->signeddisp = sdisp;
/* printf("signeddisp(`%s', level %d)=%d\n", fsm_polygraph(fsm, ltp->state, buf) */
/*         ltp->level, ltp->signeddisp); */ avgdisp_num += weight * sdisp;
                avgdisp_den += weight;
        } if (avgdisp_den != 0.0) {
                tour->avgdisp = avgdisp_num / avgdisp_den;
/* printf("weighted avgdisp=%.1f\n", tour->avgdisp); */
        }

/* Loop over all subtours:  Calculate matching cost. */

/* Case 1: "Quick and dirty alignment" without
                                   re-matching.  We simply adjust displacements
                                   based on the avg disp, but keeping the same
                                   matching.
                                 */
        if (quick_align) {
```

Jun 18 12:12 1997   qconvex.c Page 15

```
                mcost = 0.0;
                align = ROUND_TO_INT(-(tour->avgdisp));
/* printf("quick aligning by %d\n", align); */ ltp = tour->ltours;
                for (ltnum=0 ; ltnum < tour->numltours ; ltnum++, ltp++) {
                        if (ltp->tourlen < 2) {
                                continue;
                        } weight = glen = glens[ltp->state];
                        mcost += weight * ABS(ltp->signeddisp + align);
                }

} else {
                mcost = 0.0;

ltp = tour->ltours;
                for (ltnum=0 ; ltnum < tour->numltours ; ltnum++, ltp++) {
                        if (ltp->tourlen < 2) {
                                continue;
                        } weight = glen = glens[ltp->state];
                        mcost += weight * ABS(ltp->signeddisp);
                }
        }
/* printf("mcost=%.1f\n", mcost); */ ucost = 0.0;
        for (glen=tour->gmin ; glen <= tour->gmax ; glen++) {
                ucounts[glen] = tour->maxusyms[glen] - mcounts[glen];
/* printf("mcounts[%d]=%d\n", glen, mcounts[glen]); */
/* printf("ucounts[%d]=%d\n", glen, ucounts[glen]); */ weight = glen;
                ucost += weight * ucounts[glen] * tour->usymcost;
        }
/* printf("ucost=%.1f\n", ucost); */ tour->totalcost = mcost + ucost;
/* printf("total cost=%.1f\n", tour->totalcost); */
}
```

```
Jan  8 10:52 1997  invtab.c Page 1 include <stdio.h>
include <stdlib.h>
#include <ctype.h>
#include <string.h>
#include <assert.h>
#include "common.h"
#include "likeit_sys.h"

INVTAB *
invtab_create( UCHAR *query, int qlen, int gmin, int gmax, FSM *fsm )
{
        int     qpos, g, state, nstates, suboff, offset;
        int     tablesize;
        UCHAR   *p, *glens;
        USHORT  *gcnts, *goffs, *gptrs;
        USHORT  *subst, *table;
        INVTAB  *invtab;

nstates = fsm_num_states(fsm);
        glens   = fsm_polygraph_lens(fsm);
        suboff  = gmin - 1;

/* First compile polygraph frequencies by
                                tracing query's own state sequence.
                         */
        gcnts = mem_alloc(nstates * sizeof(USHORT));
        memset(gcnts, 0, nstates*sizeof(USHORT));

state = fsm_init(fsm);
        for (p=query ; *p ; p++) {
                state = fsm_transition(fsm, state, *p);
                subst = fsm_substates(fsm, state) + suboff;
                for (g=gmin ; g <= glens[state] ; g++,subst++) {
                        gcnts[*subst]++;
                }
        }

/* Calculate size of inverted table */
        tablesize = 0;
        for (g=gmin ; g <= gmax ; g++) {
                tablesize += MAX(0, qlen - (g-1));
        }

/* Calculate table row offsets */
        goffs  = mem_alloc((nstates+1) * sizeof(USHORT));
        offset = 0;
        for (state=0 ; state < nstates ; state++) {
                goffs[state] = offset;
                offset += gcnts[state];
```

```
Jan  8 10:52 1997   invtab.c Page 2

}
        goffs[nstates] = offset;
        assert(offset == tablesize);

/* Allocate inverted table and pointer array */
        table = mem_alloc(tablesize * sizeof(USHORT));
        gptrs = mem_alloc(nstates   * sizeof(USHORT));

/* Build inverted table by tracing query's
                                   state sequence, and storing coordinates
                                   as we go, using gptrs[] as an aid.
                                 */
        memset(gptrs, 0, nstates*sizeof(USHORT));
        state = fsm_init(fsm);
        for (p=query, qpos=0 ; *p ; p++,qpos++) {
                state = fsm_transition(fsm, state, *p);
                subst = fsm_substates(fsm, state) + suboff;
                for (g=gmin ; g <= glens[state] ; g++,subst++) {
                        offset = goffs[*subst] + gptrs[*subst];
                        assert(mem_address_is_valid(table, table+offset));
                        table[offset] = (USHORT) qpos;
                        gptrs[*subst]++;
                }
        }
        assert(qpos == qlen);
#ifndef NDEBUG
        for (state=0 ; state < nstates ; state++) {
                assert(gptrs[state] == gcnts[state]);
        }
endif invtab = mem_alloc(sizeof(INVTAB));

invtab->tablesize = tablesize;
        invtab->nstates   = nstates;
        invtab->gmax      = gmax;
        invtab->gcnts     = gcnts;
        invtab->goffs     = goffs;
        invtab->gptrs     = gptrs;
        invtab->table     = table;

#ifndef NDEBUG
        invtab_verify(query, fsm, invtab);
endif return invtab;
}
void
```

```
Jan  8 10:52 1997  invtab.c Page 3 invtab_gopen( INVTAB *invtab, int state )
{
        assert(state >= 0 && state < invtab->nstates);
        invtab->gptrs[state] = invtab->goffs[state];
} int
invtab_gget( INVTAB *invtab, int state )
{
        register USHORT offset;

assert(state >= 0 && state < invtab->nstates);

offset = invtab->gptrs[state];
        if (offset < invtab->goffs[state+1]) {
                invtab->gptrs[state] = offset + 1;
                return (int) invtab->table[offset];
        } else {
                return -1;
        }
} void
invtab_gunget( INVTAB *invtab, int state )
{
        register USHORT offset;

assert(state >= 0 && state < invtab->nstates);
        offset = invtab->gptrs[state];
        if (offset > invtab->goffs[state]) {
                invtab->gptrs[state] = offset - 1;
        }
} void
invtab_verify( UCHAR *query, FSM *fsm, INVTAB *invtab )
{
        int     i, qpos, oldpos, glen, state;
        UCHAR   *g1, *g2, *p;

g1 = mem_alloc((invtab->gmax+1) * sizeof(UCHAR));
        g2 = mem_alloc((invtab->gmax+1) * sizeof(UCHAR));

assert(fsm_num_states(fsm) == invtab->nstates);

for (state=0 ; state < invtab->nstates ; state++) {
                (void) fsm_polygraph(fsm, state, g1);
                glen = fsm_polygraph_len(fsm, state);

/* Open occurrences of polygraph, and travel
```

```
Jan   8 10:52 1997   invtab.c Page 4 down the thread.
                                */
                invtab_gopen(invtab, state);
                while ((qpos = invtab_gget(invtab, state)) != -1) {
                        oldpos = qpos;

/* Unget the occurrence, and get it again */
                        invtab_gunget(invtab, state);
                        qpos = invtab_gget(invtab, state);
                        assert(qpos == oldpos);

p = query + qpos - (glen-1);
                        for (i=0 ; i < glen ; i++) {
                                g2[i] = fsm_user_map_char(fsm, *p);
                                p++;
                        }
                        assert(!memcmp(g1, g2, glen));
                }
        } mem_free(g1);
        mem_free(g2);
} void
invtab_destroy( INVTAB *invtab )
{
        mem_free(invtab->gcnts);
        mem_free(invtab->goffs);
        mem_free(invtab->gptrs);
        mem_free(invtab->table);
        mem_free(invtab);
}
```

```
Jan   7 17:11 1997   heap.c Page 1 include <stdio.h>
include <stdlib.h>
#include <string.h>
#include <ctype.h>
#include <assert.h>
#include "common.h"
#include "heap.h"

static void      swapitems( HEAPKEY *keys, HEAPID *ids, int item1, int item2 );

/* Create and initialize heap data structure */

HEAP *
heap_create( int maxitems )
{
        int      space;
        HEAP     *heap;

space = mem_total_space();
        heap  = mem_alloc(sizeof(HEAP));

heap->sorted = FALSE;
        heap->hsize  = maxitems;
        heap->keys   = mem_alloc((1+maxitems) * sizeof(HEAPKEY));
        heap->ids    = mem_alloc((1+maxitems) * sizeof(HEAPID));

heap->itemcnt = 0;
        heap->totmem  = mem_total_space() - space;

return heap;
}

/* Add an item to the heap, propagating it to the appropriate place so that
   the heap property is preserved.
 */

BOOL
heap_insert( HEAP *heap, HEAPKEY key, HEAPID id )
{
        int     n, parent, child;
        HEAPKEY *keys;
        HEAPID  *ids;

assert(!heap->sorted);

keys = heap->keys;
        ids  = heap->ids;
```

```
Jan  7 17:11 1997  heap.c Page 2

/* Is heap already full? */
        if (heap->itemcnt == heap->hsize) {
                return FALSE;
        } n = ++heap->itemcnt;    /* Heap expands by one */

/* Place new item at bottom of heap */
        keys[n] = key;
        ids[n]  = id;

child  = n;
        parent = child/2;
                                /* Propagate new item (child) upward by
                                   swapping, until the heap property is
                                   satisfied, or we reach the top.
                                 */
        while (parent >= 1) {
                if (keys[parent] >= keys[child]) {
                        break;  /* Heap property satisfied */
                }

/* Swap upward so that child becomes parent,
                                   then consider the parent of the parent.
                                 */
                swapitems(keys, ids, parent, child);
                child  = parent;
                parent /= 2;
        } return TRUE;
}

/* Remove the top (highest-key) item from the heap, and adjust the heap
   so that the heap property is preserved.
 */

BOOL
heap_remove( HEAP *heap, HEAPKEY *key, HEAPID *id )
{
        int      n, parent, child;
        HEAPKEY *keys;
        HEAPID  *ids;

assert(!heap->sorted);

/* Quick return on empty heap */
        if ((n = heap->itemcnt) == 0) {
```

```
Jan  7 17:11 1997  heap.c Page 3 return FALSE;
        } keys = heap->keys;
        ids  = heap->ids;

if (key) {                      /* Return top of heap */
                *key = keys[1];
        }
        if (id) {
                *id  = ids[1];
        } keys[1] = keys[n];              /* Replace top item with last item */
        ids[1]  = ids[n];

n = --heap->itemcnt;            /* Heap shrinks by one */ parent = 1;
        child  = 2;
                                        /* Propagate top item (parent) downward by
                                           swapping, until the heap property is
                                           satisfied, or we reach the bottom again.
                                         */
        while (child <= n) {
                                        /* Must always select greater child of parent */
                if (child < n && keys[child] < keys[child+1]) {
                        child++;
                } if (keys[child] <= keys[parent]) {
                        break;  /* Heap property satisfied */
                }

/* Swap downward so that parent becomes child,
                                           then consider the children of the child.
                                         */
                swapitems(keys, ids, parent, child);
                parent = child;
                child *= 2;
        } return TRUE;
}

/* Return data associated with an item on the heap, given the item number. */

BOOL
heap_item( HEAP *heap, int itemnum, HEAPKEY *key, HEAPID *id )
{
```

```c
Jan  7 17:11 1997  heap.c Page 4 if (itemnum < 1 || itemnum > heap->itemcnt) {
                return FALSE;
        }

*key = heap->keys[itemnum];
        *id  = heap->ids[itemnum];
        return TRUE;
}

/* Return the key of the top item on the heap, which by definition is the
   highest key in the heap.
 */
HEAPKEY
heap_max_key( HEAP *heap )
{
        assert(heap->itemcnt && !heap->sorted);
        return heap->keys[1];
}

/* Sort the heap.  The resulting heap array will contain items in order
   of increasing key values.  NOTE THAT THE ITEMS NO LONGER FORM A HEAP,
   SO IT IS MEANINGLESS TO CALL THE INSERT AND REMOVE FUNCTIONS!!!!!!!!!
 */
void
heap_sort( HEAP *heap )
{
        int     n, parent, child;
        HEAPKEY *keys;
        HEAPID  *ids;

keys = heap->keys;
        ids  = heap->ids;

n = heap_num_items(heap);

while (n >= 2) {
                                /* Swap greatest and least items */
                swapitems(keys, ids, 1, n);

n--;

parent = 1;
                child  = 2;
                                /* Propagate top item (parent) downward by
                                   swapping, until the heap property is
                                   satisfied, or we reach the bottom again.
                                 */
                while (child <= n) {

/* Must always select greater child of parent */
```

```
Jan  7 17:11 1997  heap.c Page 5 if (child < n && keys[child] < keys[child+1]) {
                                child++;
                        } if (keys[child] <= keys[parent]) {
                                break;  /* Heap property satisfied */
                        }

/* Swap downward so that parent becomes child,
                                   then consider the children of the child.
                                 */
                        swapitems(keys, ids, parent, child);
                        parent = child;
                        child  *= 2;
                }
        } heap->sorted = TRUE;
}

/* Destroy a heap */ void
heap_destroy( HEAP *heap )
{
        if (!heap) {
                return;
        } mem_free(heap->keys);
        mem_free(heap->ids);
        mem_free(heap);
}

/* Debugging routine: print contents of a heap. */ void
heap_print( HEAP *heap )
{
        int     start, i, limit, ncols;

printf("%d items in heap:\n", heap->itemcnt);

ncols = 10;

start = 1;
        do {
                limit = MIN(start+ncols-1, heap->itemcnt);

printf("ITM");
```

```
Jan  7 17:11 1997  heap.c Page 6 for (i=start ; i <= limit ; i++) {
                                printf(" %6d", i);
                        }
                        printf("\n");

printf("KEY");
                        for (i=start ; i <= limit ; i++) {
                                printf(" %6.0f", heap->keys[i]);
                        }
                        printf("\n");

printf("ID#");
                        for (i=start ; i <= limit ; i++) {
                                printf(" %6ld", heap->ids[i]);
                        }
                        printf("\n\n");

start = limit+1;

} while (start <= heap->itemcnt);
} ifdef   NDEBUG
undef   NDEBUG
#define  NDEBUG_UNDEFINED
#include <assert.h>
#endif   /* NDEBUG */

BOOL
heap_verify( HEAP *heap )
{
        int     i, n, parent, child;
        HEAPKEY *keys;

n = heap->itemcnt;
        assert(n >= 0 && n <= heap->hsize);

keys = heap->keys;

/* If heap has been sorted, verify sort order */
        if (heap->sorted) {
                for (i=1 ; i < n ; i++) {
                        assert(keys[i] <= keys[i+1]);
                }

} else {
                                /* Else, verify heap property */
                parent = 1;
```

```
Jan  7 17:11 1997  heap.c Page 7 child = 2;

while (child <= n) {
                        assert(keys[child] <= keys[parent]);
                        if (child+1 <= n) {
                                assert(keys[child+1] <= keys[parent]);
                        } parent++;
                        child = parent*2;
                }
        } return TRUE;
} ifdef  NDEBUG_UNDEFINED
undef  NDEBUG_UNDEFINED
#define NDEBUG
#include <assert.h>
endif  /* NDEBUG_UNDEFINED */ static void
swapitems( HEAPKEY *keys, HEAPID *ids, int item1, int item2 )
{
        HEAPKEY rtemp;
        HEAPID  itemp;

rtemp = keys[item1];
        keys[item1] = keys[item2];
        keys[item2] = rtemp;

itemp = ids[item1];
        ids[item1] = ids[item2];
        ids[item2] = itemp;
}
```

Jan  7 17:10 1997   array.c   Page 1

```c
#include <stdio.h>
include <stdlib.h>
#include <stdarg.h>
#include "common.h"
#include "array.h"

#define array_parent(a)         (((ARRAY_AH *)(a) - 1)->d.parent)

static void     array_xcopy( array_t *target, array_t *source,
                             int object_size, int n, int *dimensions );
static array_t *array_xalloc( int obj_size, OBJECT_TYPE obj_type, int n,
                              int *dimensions, array_t **parent );
static void     read_subarray( array_t *a, FILE *fp );
static void     write_subarray( array_t *a, FILE *fp );

/* Allocate an array_t given a vector of dimensions */ array_t *
array_create( int obj_size, OBJECT_TYPE obj_type, int n, int *dims )
{
        ARRAY_AH        *h;
        array_t         *a;

if (n == 0) {           /* Create a scalar (zero-dimensional array) */

/* Allocate enough memory to hold a single
                                 * object.
                                 */
                h = mem_alloc(sizeof(ARRAY_AH) + obj_size);

if (h == NULL) {
                        return NULL;
                }

/* Fill in header */
                h->d.parent      = NULL;
                h->d.object_size = obj_size;
                h->d.object_type = obj_type;
                h->d.ndim        = 0;
                h->d.dimensions  = NULL;

/* Return pointer to the scalar object. */
                return (array_t *)(h + 1);
        } a = array_xalloc(obj_size, obj_type, n, dims, NULL);
        array_set_flags(a, 0);
```

Jan  7 17:10 1997  array.c  Page 2

```c
        return a;
}

/* Allocate a array_t given the dimensions in the argument list */ array_t *
array_create1( int obj_size, OBJECT_TYPE obj_type, int n, ...)
{
        int             i, *dimensions;
        array_t         *a;
        va_list         ap;

va_start(ap, n);
                                /* Construct an array to pass to array_create */
        dimensions = mem_alloc(n * sizeof(int));

for (i = 0; i < n; ++i) {
                dimensions[i] = va_arg(ap, int);
        } a = array_create(obj_size, obj_type, n, dimensions);

mem_free(dimensions);
        va_end(ap);

return a;
} array_t *
array_create_scalar( int obj_size, OBJECT_TYPE obj_type )
{
        return array_create(obj_size, obj_type, 0, NULL);
} array_t *array_copy( array_t *original )
{
  array_t *copy;

copy = array_create(array_object_size(original),
                      array_object_type(original),
                      array_ndim(original),
                      array_dimensions(original));
  if (copy == NULL) return(NULL);
  array_set_flags(copy, array_get_flags(original));
  array_xcopy(copy, original, array_object_size(original),
              array_ndim(original), array_dimensions(original));
  return(copy);
}
```

```
Jan  7 17:10 1997  array.c Page 3

/* Internal routine to copy a subarray into another subarray
 */
static void array_xcopy( array_t *target, array_t *source,
                         int object_size, int n, int *dimensions )
{
  int i;

if (n == 1)
     {
       (void) memcpy(target, source, object_size * dimensions[0]);
     }
  else
     {
       for(i=0; i<dimensions[0]; i++)
         array_xcopy(((array_t **)target)[i],
                     ((array_t **)source)[i],
                     object_size, n-1, dimensions+1);
     }
}

/* Internal routine to create an array_t given a vector of dimensions
 * and a parental pointer.
 */
static array_t *
array_xalloc( int obj_size, OBJECT_TYPE obj_type, int n, int *dimensions,
              array_t **parent)
{
        int             i, *dim;
        array_t         **ptrs;
        ARRAY_AH        *h;

/* Only the root array (parent=NULL) allocates
                                 * a dimensions vector; the children share it.
                                 */
        if (parent == NULL) {
                dim = mem_alloc(n * sizeof(int));
                if (dim == NULL) {
                        return NULL;
                }

/* Record all dimensions in the vector */
                for (i = 0; i < n; ++i) {
                        dim[i] = dimensions[i];
                }

} else {                /* Subarrays point inside dimensions vector */
                dim = dimensions;
        }

/* Innermost dimension (end of recursion) */
```

```c
Jan  7 17:10 1997  array.c Page 4 if (n == 1) { h = mem_alloc(sizeof(ARRAY_AH) + dim[0] * obj_size);

if (h == NULL) {
                        if (parent == NULL) {
                                mem_free(dim);
                        }
                        return NULL;
                }

/* Fill in header */
                h->d.parent      = parent;
                h->d.object_size = obj_size;
                h->d.object_type = obj_type;
                h->d.ndim        = n;
                h->d.dimensions  = dim;

/* Return pointer to start of this innermost
                                 * array, ending function recursion.
                                 */
                return (array_t *)(h + 1);
        }

/* More than one dimension still to go; create
                                 * subarrays for current dimension.
                                 */
        h = mem_alloc(sizeof(ARRAY_AH) + dim[0]*sizeof(array_t *));
        if (h == NULL) {
                if (parent == NULL) {
                        mem_free(dim);
                }
                return NULL;
        }

/* Fill in subarray header */
        h->d.parent      = parent;
        h->d.object_size = obj_size;
        h->d.object_type = obj_type;
        h->d.ndim        = n;
        h->d.dimensions  = dim;

ptrs = (array_t **)(h + 1);

/* Fill subarray with pointers to more
                                 * subarrays, recursively.
                                 */
        for (i = 0; i < dimensions[0]; ++i) {
                ptrs[i] = array_xalloc(obj_size, obj_type, n-1, dim+1,
                                        (array_t **) &ptrs[i]);
```

```
Jan   7 17:10 1997   array.c Page 5 if (ptrs[i] == NULL) {
                        for (--i; i >= 0; --i) {
                                array_destroy(ptrs[i]);
                        }
                        mem_free((ARRAY_AH *)ptrs - 1);

return NULL;
                }
        }

/* Return pointer to (sub)array */
        return (array_t *) ptrs;
}

/* Routine to free a multi-dimensional array */ void
array_destroy( array_t *a )
{
        int     i, n, *dimensions;
        array_t **ptrs, **parent;

if (a == NULL) {
                return;
        } n = array_ndim(a);
        dimensions = array_dimensions(a);

if (n == 0) {
                mem_free((ARRAY_AH *) a - 1);
                return;
        }

/* Outer dimensions: recurse to destroy
                                 * all inner subarrays.
                                 */
        if (n > 1) {
                ptrs = (array_t **) a;

for (i = 0; i < dimensions[0]; ++i) {
                        array_destroy(ptrs[i]);
                }
        }

/* If this is a subarray, clear pointer to it
                                 * in its parent array.
                                 */
```

```
Jan  7 17:10 1997  array.c Page 6 parent = array_parent(a);
        if (parent != NULL) {
                *parent = NULL;

} else {                        /* Root array: Free dimensions array */
                mem_free(dimensions);
        }

/* Free current subarray */
        mem_free((ARRAY_AH *) a - 1);
} int
array_get_flags( array_t *a )
{
        if (a == NULL) {
                FATAL("array_get_flags", "Called with NULL array pointer");
        } if (array_parent(a) != NULL) {
                FATAL("array_get_flags", "Called with subarray pointer");
        } return ((ARRAY_AH *)(a) - 1)->d.flags;
} void
array_set_flags( array_t *a, int flags )
{
        if (a == NULL) {
                FATAL("array_set_flags", "Called with NULL array pointer");
        } while (array_parent(a) != NULL) {
                FATAL("array_set_flags", "Called with subarray pointer");
        }

((ARRAY_AH *)(a) - 1)->d.flags = flags;
}

/* Routine to read an array from a file.  Environment variable 'ARCH'
   is used to verify that the file was written by a machine having the same
   architecture as the reader.
 */
array_t *
array_read( char *label, char *filename )
{
        int             c, i, ni, osize, ndims, flags, *dims;
        OBJECT_TYPE     otype;
        array_t         *a;
```

Jan  7 17:10 1997  array.c  Page 7

```c
        FILE            *fp;
        char            arch1[100], arch2[100], *p;

p = getenv("ARCH");

if (p == NULL) {
                FATAL("array_read", "Environment variable ARCH must be set!");
        } strcpy(arch1, p);

if ((fp = fopen(filename, "r")) == NULL) {
                FATAL("array_read", "Cannot open file %s for reading", filename)
        }
        for (i=0 ; (c = fgetc(fp)) ; i++) {
                arch2[i] = c;
        }
        arch2[i] = '\0';

if (strcmp(arch1, arch2)) {
                FATAL("array_read", "File written by different mach arch (%s)",
                        arch2);
        } for (i=0 ; (c = fgetc(fp)) ; i++) {
                label[i] = c;
        }
        label[i] = '\0';

if ((ni = fread(&osize, sizeof(int), 1, fp)) != 1) {
                FATAL("array_read", "fread(osize) failed");
        } if ((ni = fread(&otype, sizeof(OBJECT_TYPE), 1, fp)) != 1) {
                FATAL("array_read", "fread(otype) failed");
        } if ((ni = fread(&flags, sizeof(int), 1, fp)) != 1) {
                FATAL("array_read", "fread(flags) failed");
        } if ((ni = fread(&ndims, sizeof(int), 1, fp)) != 1) {
                FATAL("array_read", "fread(ndims) failed");
        } if (ndims == 0) {
                a = array_create_scalar(osize, otype);
                if ((ni = fread(a, osize, 1, fp)) != 1) {
                        FATAL("array_read", "fread(scalar) failed");
                }
```

```
Jan  7 17:10 1997  array.c Page 8

} else { dims = mem_alloc(ndims*sizeof(int));

if ((ni = fread(dims, sizeof(int), ndims, fp)) != ndims) {
                        FATAL("array_read", "fread(dims) failed");
                } a = array_create(osize, otype, ndims, dims);
                mem_free(dims);

read_subarray(a, fp);
        } array_set_flags(a, flags);

fclose(fp);

return a;
}
static void
read_subarray( array_t *a, FILE *fp )
{
        int     i, ni, len;
        BOOL    exists;

if (array_ndim(a) == 1) {          /* End of recursion */ len = (array_dimensions(a))[0];
                if ((ni = fread(a, array_object_size(a), len, fp)) != len) {
                        FATAL("read_subarray", "data read failed");
                }

} else {                           /* More than one dimension remains */ len = (array_dimensions(a))[0];

/* Loop over subarrays */
                for (i=0 ; i < len ; i++) {

/* Read byte telling us if this subarray
                                 * exists.
                                 */
                        if ((exists = fgetc(fp)) == EOF) {
                                FATAL("read_subarray", "EOF unexpected");
                        }
```

```
Jan  7 17:10 1997  array.c Page 9 if (exists) {
                                read_subarray(((array_t **)a)[i], fp);
                        } else {
                                array_destroy(((array_t **)a)[i]);
                        }
                }
        }
} void
array_write( array_t *a, char *label, char *filename )
{
        int             i, ni, osize, ndims, flags, *dims;
        OBJECT_TYPE     otype;
        FILE            *fp;
        char            arch[100], *p;

p = getenv("ARCH");

if (p == NULL) {
                FATAL("array_write", "Environment variable ARCH must be set!");
        } strcpy(arch, p);

if ((fp = fopen(filename, "w")) == NULL) {
                FATAL("array_write", "Cannot open %s for writing", filename);
        } i = strlen(arch) + 1;
        if ((ni = fwrite(arch, sizeof(char), i, fp)) != i) {
                FATAL("array_write", "fwrite(arch) failed");
        } if (label) {
                i = strlen(label) + 1;
                if ((ni = fwrite(label, sizeof(char), i, fp)) != i) {
                        FATAL("array_write", "fwrite(label) failed");
                }
        } else {
                if (fputc('\0', fp) != '\0') {
                        FATAL("array_write", "fwrite(label) failed");
                }
        } osize = array_object_size(a);
        if ((ni = fwrite(&osize, sizeof(int), 1, fp)) != 1) {
                FATAL("array_write", "fwrite(osize) failed");
        }
```

```
Jan  7 17:10 1997  array.c Page 10 otype = array_object_type(a);
        if ((ni = fwrite(&otype, sizeof(OBJECT_TYPE), 1, fp)) != 1) {
                FATAL("array_write", "fwrite(otype) failed");
        } flags = array_get_flags(a);
        if ((ni = fwrite(&flags, sizeof(int), 1, fp)) != 1) {
                FATAL("array_write", "fwrite(flags) failed");
        } ndims = array_ndim(a);
        if ((ni = fwrite(&ndims, sizeof(int), 1, fp)) != 1) {
                FATAL("array_write", "fwrite(ndims) failed");
        } if (ndims == 0) {
                if ((ni = fwrite(a, osize, 1, fp)) != 1) {
                        FATAL("array_write", "fwrite(scalar) failed");
                }

} else {
                dims = array_dimensions(a);
                if ((ni = fwrite(dims, sizeof(int), ndims, fp)) != ndims) {
                        FATAL("array_write", "fwrite(dims) failed");
                } write_subarray(a, fp);
        } fclose(fp);
} static void
write_subarray( array_t *a, FILE *fp )
{
        int     i, ni, len;

if (array_ndim(a) == 1) {       /* End of recursion */ len = (array_dimensions(a))[0];
                if ((ni = fwrite(a, array_object_size(a), len, fp)) != len) {
                        FATAL("write_subarray", "data write failed");
                }

} else {                        /* More than one dimension remains */ len = (array_dimensions(a))[0];
```

```c
                        /* Loop over this dimension's subarrays */
            for (i=0 ; i < len ; i++) {

/* Check for subarray's existence */
                if (((array_t **)a)[i]) {
                        if (fputc(TRUE, fp) != TRUE) {
                                FATAL("write_subarray", "write failed");
                        }
                        write_subarray(((array_t **)a)[i], fp);

} else {
                        if (fputc(FALSE, fp) != FALSE) {
                                FATAL("write_subarray", "write failed");
                        }
                }
            }

}
}
```

```c
Jan  7 17:16 1997   mem.c Page 1 include <assert.h>
include <stdio.h>
include <stdlib.h>
#include <string.h>
#include "common.h"

int     Memory_bytes_used;

#define mem_header(mem_p)      ((memory_t *)(mem_p)-1)

/* Routine to allocate memory */ void *
mem_alloc( int bytes )
{
        int     memsize;
        void    *p;

assert(bytes >= 0);
                                /* Allocate "bytes" plus header */
        memsize = sizeof(memory_t) + bytes;
        if ((p = malloc(memsize)) == NULL) {
                fprintf(stderr, "mem_alloc: malloc() returned NULL!");
                return NULL;
        }
                                /* Store size in header, and keep track of
                                   total memory allocated.
                                 */
        ((memory_t *)p)->self.bytes   = memsize;

Memory_bytes_used    += memsize;

p = (memory_t *)p + 1;  /* Pointer to usable portion */
        assert(mem_size(p) == bytes);

return p;
}

/* Routine to resize memory */ void *
mem_realloc( void *pointer, int bytes )
{
        int             oldsize, newsize;
        memory_t        *header;

assert(bytes >= 0);
        assert(pointer != NULL);
```

```
Jan  7 17:16 1997  mem.c Page 2 header = (memory_t *)pointer - 1;

oldsize = header->self.bytes;
        newsize = sizeof(memory_t) + bytes;

if ((header = realloc(header, newsize)) == NULL) {
                fprintf(stderr, "mem_realloc: realloc() returned NULL!");
                return NULL;
        } header->self.bytes = newsize;

Memory_bytes_used += (newsize - oldsize);

pointer = header + 1;           /* Pointer to usable portion */ assert(mem_size(pointer) == bytes);
        return pointer;
}

/* Routine to dup memory */ void *
mem_copy( void *p )
{
        int        size;
        void       *np;
        memory_t   *h;

if (p == NULL) {
                return NULL;
        } h    = (memory_t *)p - 1;
        size = h->self.bytes - sizeof(memory_t);

if ((np = mem_alloc(size)) == NULL) {
                return NULL;
        } assert(h->self.bytes == ((memory_t *)np - 1)->self.bytes);

np = memcpy(np, p, size);
        assert(mem_size(np) == mem_size(p));

return np;
}

/* Routine to free memory */
```

Jan  7 17:16 1997  mem.c Page 3

```c
void
mem_free( void *p )
{
        memory_t *h;

if (p != NULL) {
                h = (memory_t *)p - 1;

Memory_bytes_used -= h->self.bytes;

h->self.bytes = 0;      /* Invalidate block */
                free(h);
        }
}

/* Routine to move a block of memory from s2 to s1.
   Overlapping moves are handled correctly.
 */
void *
mem_move( void *s1, void *s2, unsigned long length )
{
        unsigned char   *p1, *p2;

assert(s1 != NULL);
        assert(s2 != NULL);

p1 = s1;
        p2 = s2;

if (s1 < s2) {
                while (length--) {
                        *p1++ = *p2++;
                }

} else if (s1 > s2) {
                p1 += length;
                p2 += length;

while (length--) {
                        *--p1 = *--p2;
                }
        } return s1;
}

/* This routine returns whether the address addr falls in memory block. */

BOOLEAN
mem_address_is_valid( const void *mem, const void *addr )
```

```c
Jan  7 17:16 1997  mem.c Page 4

{
        int             bytes;
        memory_t        *h;

if (!mem) {
                return FALSE;
        } h = (memory_t *)mem - 1;
        bytes = h->self.bytes - sizeof(memory_t);
        assert(bytes == mem_size(mem));

return (bytes > 0) &&
                (addr >= mem) &&
                        ((unsigned char *)addr < (unsigned char *)mem + bytes);
}

/* Returns 0 if the two blocks of memory are equivalent */
int
mem_compare(const void *left, const void *right)
{
        memory_t        *lh, *rh;
        int             left_bytes, right_bytes, bytes, result;

lh = (memory_t *)left - 1;
        rh = (memory_t *)right - 1;

left_bytes = lh->self.bytes - sizeof(memory_t);
        right_bytes = rh->self.bytes - sizeof(memory_t);
        bytes = MIN(left_bytes, right_bytes);

assert(left_bytes == mem_size(left));
        assert(right_bytes == mem_size(right));

if ((result = memcmp(left, right, bytes)) == 0) {
                result = left_bytes - right_bytes;
        } return result;
}
```

Dec 16 16:50 1996  timer.c Page 1

```c
#include <unistd.h>
#include <limits.h>
#include <sys/times.h>

/* Return CPU time in seconds since last call.
   Usage:
                (void) cpu_interval();

{
                        (code to be timed);
                } time_elapsed = cpu_interval();
*/
double
cpu_interval( void )
{
        static clock_t  cputime;
        struct tms      tmsbuffer;

clock_t thetime, theinterval;

(void) times(&tmsbuffer);

thetime     = tmsbuffer.tms_utime;
        theinterval = thetime - cputime;

cputime = thetime;

return ((double)theinterval) / sysconf(_SC_CLK_TCK);
}
```

```
Jan  9 14:56 1997   utils.c  Page 1 include <stdio.h>
include <stdlib.h>
#include <stdarg.h>
#include <string.h>
#include <ctype.h>
#include <assert.h>
#include "common.h"

int
ustrlen( UCHAR *s )
{
        int     len;

len = 0;
        while (*s++) {
                len++;
        }
        return len;
}

UCHAR *
ustrcpy( UCHAR *dst, UCHAR *src )
{
        UCHAR   *dstsav = dst;

while (*src) {
                *dst++ = *src++;
        }
        *dst = 0;
        return dstsav;
}

UCHAR *
ustrncpy( UCHAR *dst, UCHAR *src, int n )
{
        UCHAR   *dstsav = dst;

while (n--) {
                if (*src) {
                        *dst++ = *src++;
                } else {
                        *dst++ = 0;
                }
        }
        return dstsav;
}

UCHAR *
ustrstr( UCHAR *s1, UCHAR *s2 )
{
```

```
Jan  9 14:56 1997   utils.c Page 2 int     len;

if (!*s2) {
                return s1;
        } len = ustrlen(s2);

while (*s1) {
                if (!memcmp(s1, s2, len)) {
                        return s1;
                }
                s1++;
        } return NULL;
}

/* This routine condenses (in place) the whitespace in 8-bit character data
   until a newline or null character is encountered.  The newline is replaced
   with a null character, thus transforming the line into a null-terminated
   record.  Condensation is defined to be the elimination of leading and
   trailing whitespace and the reduction of each internal whitespace sequence
   to a single ' ' character.

The size of the condensed record is returned in csize (if non-NULL).  The
   return value of the function is the address of the next (unread) character,
   which may then be passed back to this routine to process the next data line.
 */

UCHAR *
ustrcondense( UCHAR *s, int *csize )
{
        register UCHAR  *rp, *wp;
        register int    c;
        register BOOL   begin, white;

begin = TRUE;
        white = FALSE;

for (rp=wp=s ; *rp ; rp++) {
                c = *rp;

if (isspace(c)) {
                        if (c == '\n') {
                                rp++;
                                break;
                        }
```

Jan  9 14:56 1997   utils.c Page 3

```c
                                white = TRUE;
                } else {
                        if (begin) {
                                begin = FALSE;
                                white = FALSE;

} else {
                                if (white) {
                                        *wp++ = (UCHAR) ' ';
                                        white = FALSE;
                                }
                        }
                        *wp++ = (UCHAR) c;
                }
        }
        *wp = '\0';
        *csize = wp - s;

return rp;
}

/* ustrcpy a string, adding a single space char at beginning and end.
   Destination buffer is assumed to be at least 2 bytes bigger than source.
 */
UCHAR *
ustrcpy_spacepad( UCHAR *dst, UCHAR *src )
{
        UCHAR   *dstsav = dst;

*dst++ = ' ';
        while (*src) {
                *dst++ = *src++;
        }
        *dst++ = ' ';
        *dst   = 0;

return dstsav;
}

/* Routine supporting WARN macro */ void
error_warning( char *function, char *message, ... )
{
        va_list ap;

va_start(ap, message);

fprintf(stderr, "WARNING in function %s:\n", function);
```

Jan  9 14:56 1997   utils.c Page 4

```c
        fprintf(stderr, "\t");
        vfprintf(stderr, message, ap);
        fprintf(stderr, "\n");

va_end(ap);
}

/* Routine supporting FATAL macro */ void
error_fatal( char *function, char *message, ... )
{
        va_list ap;

va_start(ap, message);

fprintf(stderr, "FATAL ERROR in function %s:\n", function);
        fprintf(stderr, "\t");
        vfprintf(stderr, message, ap);
        fprintf(stderr, "\n");

va_end(ap);

exit(1);
}
```